(12) United States Patent
Janko

(10) Patent No.: US 11,049,421 B2
(45) Date of Patent: Jun. 29, 2021

(54) LABEL ASSEMBLIES FOR ADVERSE ENVIRONMENTS

(71) Applicant: Avery Dennison Corporation, Glendale, CA (US)

(72) Inventor: Pavel Janko, Haarlem (NL)

(73) Assignee: Avery Dennison Corporation, Glendale, CA (US)

(*) Notice: Subject to any disclaimer, the term of this patent is extended or adjusted under 35 U.S.C. 154(b) by 230 days.

(21) Appl. No.: 15/016,919

(22) Filed: Feb. 5, 2016

(65) Prior Publication Data

US 2016/0232821 A1 Aug. 11, 2016

Related U.S. Application Data

(60) Provisional application No. 62/112,216, filed on Feb. 5, 2015.

(51) Int. Cl.
*G09F 3/02* (2006.01)
*C09J 7/24* (2018.01)
*B31D 1/02* (2006.01)
*G09F 3/10* (2006.01)
*C09J 9/00* (2006.01)
*C09J 7/38* (2018.01)
*C09J 5/00* (2006.01)

(52) U.S. Cl.
CPC ............. *G09F 3/10* (2013.01); *C09J 5/00* (2013.01); *C09J 7/38* (2018.01); *C09J 9/00* (2013.01); *G09F 3/02* (2013.01); *C09J 2203/326* (2013.01); *C09J 2203/334* (2013.01); *C09J 2301/302* (2020.08); *G09F 2003/0232* (2013.01); *G09F 2003/0233* (2013.01); *G09F 2003/0235* (2013.01)

(58) Field of Classification Search
CPC ...... G09F 3/10; G09F 3/02; G09F 2003/0235; G09F 2003/0233; G09F 2003/0232; C09J 7/38; C09J 5/00; C09J 9/00; C09J 2201/606; C09J 2203/334; C09J 2203/326
USPC .......................................................... 156/60
See application file for complete search history.

(56) References Cited

U.S. PATENT DOCUMENTS

| 3,408,008 | A | 10/1968 | Cocks |
| 3,619,270 | A | 11/1971 | Tesch |
| 3,639,500 | A | 2/1972 | Muny et al. |
| 4,002,601 | A | 1/1977 | Hajek et al. |
| 4,049,483 | A | 9/1977 | Loder et al. |

(Continued)

FOREIGN PATENT DOCUMENTS

| CN | 1330686 | 1/2002 |
| CN | 101000899 | 7/2007 |

(Continued)

OTHER PUBLICATIONS

Taking PSA to a Different Level of Performance, Wigdorski et al.*

(Continued)

*Primary Examiner* — Michael N Orlando
*Assistant Examiner* — Christian Roldan

(57) ABSTRACT

Various labels for use in adverse environments are described. The labels are particularly well suited for applications in which a permanent label bond is required. The labels utilize a two stage adhesive which is initially in the form of a pressure sensitive adhesive (PSA) and then upon heating, converted to a permanent non-PSA.

25 Claims, 5 Drawing Sheets

(56) References Cited

U.S. PATENT DOCUMENTS

| | | | |
|---|---|---|---|
| 4,135,033 A | 1/1979 | Lawton | |
| 4,143,858 A | 3/1979 | Schmidt, III et al. | |
| 4,185,050 A * | 1/1980 | Lazear | C09J 133/08 |
| | | | 525/221 |
| 4,288,527 A | 9/1981 | Morgan | |
| 4,507,429 A * | 3/1985 | Lenney | C08F 2/30 |
| | | | 524/377 |
| 4,590,230 A | 5/1986 | Kamada et al. | |
| 4,713,273 A | 12/1987 | Freedman | |
| 4,914,253 A | 4/1990 | Chang | |
| 5,024,880 A | 6/1991 | Veasley et al. | |
| 5,189,176 A | 2/1993 | Blum et al. | |
| 5,194,486 A | 6/1993 | Levine et al. | |
| 5,252,694 A | 10/1993 | Willett et al. | |
| 5,264,532 A * | 11/1993 | Bernard | C09J 133/08 |
| | | | 526/261 |
| 5,348,589 A | 9/1994 | Arai et al. | |
| 5,348,780 A * | 9/1994 | Boggs | G09F 3/0288 |
| | | | 281/2 |
| 5,462,797 A | 10/1995 | Williams et al. | |
| 5,468,652 A | 11/1995 | Gee | |
| 5,593,759 A * | 1/1997 | Vargas | C09J 7/20 |
| | | | 428/200 |
| 5,625,006 A | 4/1997 | Callahan, Jr. et al. | |
| 5,645,764 A | 7/1997 | Angelopoulos et al. | |
| 5,695,837 A | 12/1997 | Everaerts et al. | |
| 5,721,289 A | 2/1998 | Karim et al. | |
| 5,800,724 A | 9/1998 | Habeger et al. | |
| 5,905,099 A | 5/1999 | Everaerts et al. | |
| 5,907,018 A | 5/1999 | Mazurek et al. | |
| 5,951,786 A | 9/1999 | Gee et al. | |
| 6,011,307 A | 1/2000 | Jiang et al. | |
| 6,077,527 A | 6/2000 | Tan et al. | |
| 6,106,982 A | 8/2000 | Mientus et al. | |
| 6,204,350 B1 | 3/2001 | Liu et al. | |
| 6,228,486 B1 | 5/2001 | Kittel et al. | |
| 6,235,850 B1 | 5/2001 | Perez et al. | |
| 6,319,979 B1 | 11/2001 | Dubois et al. | |
| 6,344,515 B1 | 2/2002 | Parikh et al. | |
| 6,353,037 B1 | 3/2002 | Thunhorst et al. | |
| 6,362,249 B2 | 3/2002 | Chawla | |
| 6,391,415 B1 | 5/2002 | McCurry et al. | |
| 6,489,392 B1 | 12/2002 | Lappalainen et al. | |
| 6,497,949 B1 | 12/2002 | Hyde et al. | |
| 6,503,620 B1 * | 1/2003 | Xie | B32B 7/06 |
| | | | 428/354 |
| 6,541,872 B1 | 4/2003 | Schrock et al. | |
| 6,613,857 B1 | 9/2003 | Koch et al. | |
| 6,641,911 B1 | 11/2003 | Puerkner et al. | |
| 6,653,408 B1 | 11/2003 | St. Clair | |
| 6,664,318 B1 | 12/2003 | Bymark et al. | |
| 6,770,164 B1 | 5/2004 | Schrock et al. | |
| 6,756,095 B2 * | 6/2004 | Sandt | B32B 7/12 |
| | | | 283/81 |
| 6,790,903 B1 | 9/2004 | Majolo et al. | |
| 6,844,391 B1 | 1/2005 | Iyer et al. | |
| 6,852,801 B1 | 2/2005 | Briggs et al. | |
| 6,866,919 B2 | 3/2005 | Ikeguchi et al. | |
| 6,951,596 B2 | 10/2005 | Green et al. | |
| 7,088,248 B2 | 8/2006 | Forster | |
| 7,144,751 B2 | 12/2006 | Gee et al. | |
| 7,212,127 B2 | 5/2007 | Jacober et al. | |
| 7,225,992 B2 | 6/2007 | Forster | |
| 7,247,659 B2 | 7/2007 | Kura et al. | |
| 7,298,266 B2 | 11/2007 | Forster | |
| 7,465,493 B2 | 12/2008 | Lu | |
| 7,514,528 B2 | 4/2009 | Kauffman et al. | |
| 7,517,579 B2 | 4/2009 | Campbell et al. | |
| 7,524,911 B2 | 4/2009 | Karjala et al. | |
| 7,575,653 B2 | 8/2009 | Johnson et al. | |
| 7,691,437 B2 | 4/2010 | Ellis et al. | |
| 7,703,687 B2 * | 4/2010 | Barczyk | G06K 19/07749 |
| | | | 235/380 |
| 7,776,969 B2 | 8/2010 | Adkins | |
| 7,786,868 B2 | 8/2010 | Forster | |
| 7,875,500 B2 | 1/2011 | Inada et al. | |
| 7,968,194 B2 | 6/2011 | Inada et al. | |
| 7,968,195 B2 | 6/2011 | Inada et al. | |
| 7,989,543 B2 | 8/2011 | Karjala et al. | |
| 8,068,028 B2 | 11/2011 | Phaneuf | |
| 8,080,177 B2 | 12/2011 | Long et al. | |
| 8,168,035 B2 | 5/2012 | Uesugi et al. | |
| 8,222,339 B2 | 7/2012 | Valvac et al. | |
| 8,242,185 B2 | 8/2012 | Smith et al. | |
| 8,287,949 B2 | 10/2012 | Maak et al. | |
| 8,289,165 B2 | 10/2012 | Forster | |
| 8,298,367 B2 | 10/2012 | Beger et al. | |
| 8,593,256 B2 | 11/2013 | Isabell | |
| 8,617,930 B2 | 12/2013 | Inada et al. | |
| 8,734,939 B2 | 5/2014 | Herr et al. | |
| 9,023,954 B1 | 5/2015 | Wright | |
| 9,040,155 B2 | 5/2015 | Ha et al. | |
| 9,062,140 B2 | 6/2015 | Fujimaru et al. | |
| 9,074,087 B2 | 7/2015 | Chen et al. | |
| 9,181,365 B2 | 11/2015 | Malofsky et al. | |
| 9,216,434 B2 | 12/2015 | Xiao et al. | |
| 9,234,067 B2 | 1/2016 | Hayes et al. | |
| 9,708,509 B2 * | 7/2017 | Zajaczkowski | C09J 4/00 |
| 9,714,365 B2 | 7/2017 | Zajaczkowski et al. | |
| 9,725,623 B2 | 8/2017 | Zajaczkowski et al. | |
| 9,738,817 B2 | 8/2017 | Zajaczkowski et al. | |
| 9,780,509 B2 | 10/2017 | Chin | |
| 10,035,930 B2 | 7/2018 | Zajaczkowski et al. | |
| 10,040,973 B2 | 8/2018 | Zajaczkowski et al. | |
| 10,040,974 B2 | 8/2018 | Zajaczkowski et al. | |
| 10,040,978 B2 | 8/2018 | Zajaczkowski et al. | |
| 10,100,233 B2 | 10/2018 | Zajaczkowski et al. | |
| 10,457,838 B2 | 10/2019 | Zajaczkowski et al. | |
| 10,526,511 B2 | 1/2020 | Hartinger et al. | |
| 10,533,117 B2 | 1/2020 | Zajaczkowski et al. | |
| 10,597,560 B2 | 3/2020 | Zajaczkowski et al. | |
| 2002/0028326 A1 | 3/2002 | Lhila et al. | |
| 2002/0185222 A1 * | 12/2002 | Wigdorski | C08F 220/18 |
| | | | 156/330 |
| 2004/0058133 A1 * | 3/2004 | Bilodeau | B32B 27/08 |
| | | | 428/195.1 |
| 2004/0091694 A1 | 5/2004 | Holzer et al. | |
| 2004/0261839 A1 | 12/2004 | Gee et al. | |
| 2005/0215655 A1 * | 9/2005 | Bilodeau | C08F 279/02 |
| | | | 522/7 |
| 2005/0266237 A1 | 12/2005 | Asthana et al. | |
| 2006/0128065 A1 | 6/2006 | Inada et al. | |
| 2006/0155085 A1 | 7/2006 | Kohgo et al. | |
| 2007/0021566 A1 | 1/2007 | Tse et al. | |
| 2007/0036930 A1 | 2/2007 | Kontani et al. | |
| 2007/0092733 A1 | 4/2007 | Yang et al. | |
| 2007/0231571 A1 | 10/2007 | Lane et al. | |
| 2007/0261785 A1 | 11/2007 | Izumi et al. | |
| 2008/0038528 A1 | 2/2008 | Sankar | |
| 2008/0160300 A1 | 7/2008 | Hwang et al. | |
| 2008/0171187 A1 | 7/2008 | Inada et al. | |
| 2008/0280086 A1 | 11/2008 | Sheridan et al. | |
| 2008/0281047 A1 | 11/2008 | Kishioka | |
| 2009/0075008 A1 | 3/2009 | Hwang et al. | |
| 2009/0142506 A1 | 6/2009 | Roesler et al. | |
| 2009/0194320 A1 | 8/2009 | Okumara | |
| 2010/0098962 A1 | 4/2010 | Hanley | |
| 2010/0101723 A1 | 4/2010 | Okamoto et al. | |
| 2010/0112346 A1 | 5/2010 | Kondou et al. | |
| 2010/0120931 A1 | 5/2010 | Zajaczkowski et al. | |
| 2010/0200063 A1 | 8/2010 | Djeu | |
| 2010/0233467 A1 | 9/2010 | Niwa et al. | |
| 2010/0311920 A1 | 12/2010 | Gonzalez et al. | |
| 2010/0314813 A1 | 12/2010 | Wojtowicki et al. | |
| 2011/0070434 A1 | 3/2011 | Hirose et al. | |
| 2011/0100415 A1 | 5/2011 | Osamura et al. | |
| 2011/0122343 A1 | 5/2011 | Park et al. | |
| 2011/0159238 A1 | 6/2011 | Kawamori et al. | |
| 2011/0177341 A1 | 7/2011 | Clark et al. | |
| 2011/0213067 A1 | 9/2011 | Moeller et al. | |
| 2011/0250446 A1 | 10/2011 | Higuchi et al. | |
| 2011/0300709 A1 | 12/2011 | Shintani | |
| 2012/0000510 A1 | 1/2012 | Wiedeman et al. | |

(56) References Cited

U.S. PATENT DOCUMENTS

| | | |
|---|---|---|
| 2012/0028380 A1 | 2/2012 | Takamoto et al. |
| 2012/0058334 A1 | 3/2012 | Okamoto et al. |
| 2012/0126380 A1 | 5/2012 | Uenda et al. |
| 2012/0128966 A1 | 5/2012 | Ma et al. |
| 2012/0171915 A1 | 7/2012 | Bartholomew et al. |
| 2012/0177901 A1 | 7/2012 | Hirose et al. |
| 2012/0185222 A1 | 7/2012 | Frepoli et al. |
| 2012/0237764 A1 | 9/2012 | Soejima et al. |
| 2012/0259050 A1 | 10/2012 | Vitrano et al. |
| 2012/0276376 A1 | 11/2012 | Yonezaki |
| 2012/0325402 A1 | 12/2012 | Suwa et al. |
| 2013/0034737 A1 | 2/2013 | Imoto et al. |
| 2013/0136874 A1 | 5/2013 | Xia et al. |
| 2013/0158176 A1 | 6/2013 | Hu et al. |
| 2013/0177758 A1 | 7/2013 | Shigetomi et al. |
| 2013/0190457 A1 | 7/2013 | Prenzel et al. |
| 2013/0233485 A1 | 9/2013 | Herr et al. |
| 2013/0273362 A1 | 10/2013 | Traser et al. |
| 2013/0330546 A1 | 12/2013 | Takami et al. |
| 2013/0344276 A1 | 12/2013 | Seitz et al. |
| 2014/0008821 A1 | 1/2014 | Toyoda et al. |
| 2014/0162082 A1 | 6/2014 | Gleason et al. |
| 2014/0213996 A1 | 7/2014 | Petersen et al. |
| 2014/0255681 A1* | 9/2014 | Epple ................. C09J 7/26 428/317.3 |
| 2014/0377554 A1 | 12/2014 | Cho et al. |
| 2015/0073110 A1 | 3/2015 | Malofsky et al. |
| 2015/0087760 A1 | 3/2015 | Kanderski et al. |
| 2015/0137089 A1 | 5/2015 | Kitazawa et al. |
| 2015/0140343 A1 | 5/2015 | Hattori et al. |
| 2015/0159053 A1 | 6/2015 | Schumann et al. |
| 2015/0252227 A1 | 9/2015 | Zajaczkowski et al. |
| 2015/0267090 A1 | 9/2015 | Zajaczkowski et al. |
| 2015/0275057 A1 | 10/2015 | Zajaczkowski et al. |
| 2015/0275058 A1 | 10/2015 | Zajaczkowski et al. |
| 2015/0299536 A1 | 10/2015 | Xiao et al. |
| 2016/0053056 A1 | 2/2016 | Gould et al. |
| 2016/0257858 A1 | 9/2016 | Zajaczkowski et al. |
| 2017/0128615 A1 | 5/2017 | Bartholomew et al. |
| 2017/0275501 A1 | 9/2017 | Zajaczkowski et al. |
| 2017/0275502 A1 | 9/2017 | Zajaczkowski et al. |
| 2017/0275503 A1 | 9/2017 | Zajaczkowski et al. |
| 2017/0275504 A1 | 9/2017 | Zajaczkowski et al. |
| 2018/0179422 A1 | 6/2018 | Hartinger et al. |
| 2018/0305583 A1 | 10/2018 | Zajaczkowski et al. |
| 2018/0305584 A1 | 10/2018 | Zajaczkowski et al. |
| 2018/0305585 A1 | 10/2018 | Zajaczkowski et al. |
| 2018/0305591 A1 | 10/2018 | Zajaczkowski et al. |
| 2020/0024490 A1 | 1/2020 | Zajaczkowski et al. |

FOREIGN PATENT DOCUMENTS

| | | |
|---|---|---|
| CN | 101225153 | 7/2008 |
| CN | 101230177 | 7/2008 |
| CN | 101297011 | 10/2008 |
| CN | 101445585 | 6/2009 |
| CN | 101641418 | 2/2010 |
| CN | 102876248 | 1/2013 |
| CN | 103108930 | 5/2013 |
| CN | 103275656 | 9/2013 |
| CN | 107075321 | 8/2017 |
| EA | 011898 | 6/2009 |
| EP | 0015004 | 5/1984 |
| EP | 0400703 | 12/1990 |
| EP | 0471767 | 2/1992 |
| EP | 0529546 | 3/1993 |
| EP | 1045886 | 9/2003 |
| EP | 1479746 | 11/2004 |
| EP | 1311559 | 8/2006 |
| EP | 1792925 | 6/2007 |
| EP | 1358066 | 3/2010 |
| EP | 2236534 | 10/2010 |
| EP | 2414418 | 2/2012 |
| EP | 2552497 | 2/2013 |
| EP | 2643418 | 10/2013 |
| EP | 2759578 | 7/2014 |
| EP | 2831125 | 2/2015 |
| JP | 5-194917 | 8/1993 |
| JP | 2001-288438 | 10/2001 |
| JP | 2002-285106 | 10/2002 |
| JP | 2004-524993 | 8/2004 |
| JP | 2005-520266 | 7/2005 |
| JP | 2013-202847 | 10/2013 |
| KR | 10-2008-0027358 | 3/2008 |
| KR | 2008-0060604 | 7/2008 |
| KR | 10-2012-0055583 | 5/2012 |
| RU | 2461074 | 9/2012 |
| TW | 201245399 | 11/2012 |
| WO | 97/33921 | 9/1997 |
| WO | 98/03603 | 1/1998 |
| WO | 2000/042648 | 7/2000 |
| WO | 2003/045120 | 5/2003 |
| WO | 2004/015019 | 2/2004 |
| WO | 2004/109786 | 12/2004 |
| WO | 2005/103178 | 11/2005 |
| WO | 2006/101699 | 9/2006 |
| WO | 2006/102016 | 9/2006 |
| WO | 2007/047513 | 4/2007 |
| WO | 2008/005501 | 1/2008 |
| WO | 2008/067503 | 6/2008 |
| WO | 2008/093398 | 8/2008 |
| WO | 2008/093653 | 8/2008 |
| WO | 2009/029476 | 3/2009 |
| WO | 2009/133175 | 11/2009 |
| WO | 2010/026172 | 3/2010 |
| WO | 2010/074135 | 7/2010 |
| WO | 2010/078611 | 7/2010 |
| WO | 2010/112537 | 10/2010 |
| WO | 2011/011729 | 1/2011 |
| WO | 2011/084438 | 7/2011 |
| WO | 2011/159716 | 12/2011 |
| WO | 2011/159720 | 12/2011 |
| WO | 2011/159722 | 12/2011 |
| WO | 2011/159727 | 12/2011 |
| WO | 2012/031825 | 3/2012 |
| WO | 2012/035958 | 3/2012 |
| WO | 2012/071484 | 5/2012 |
| WO | 2012/088384 | 6/2012 |
| WO | 2012/129489 | 9/2012 |
| WO | 2013/019492 | 2/2013 |
| WO | 2013/055581 | 4/2013 |
| WO | 2013/083670 | 6/2013 |
| WO | 2013/096068 | 6/2013 |
| WO | 2013-115851 | 8/2013 |
| WO | 2013/148041 | 10/2013 |
| WO | 2013/149165 | 10/2013 |
| WO | 2014/018231 | 1/2014 |
| WO | 2014/018312 | 1/2014 |
| WO | 2014/059055 | 4/2014 |
| WO | 2014-059055 | 4/2014 |
| WO | 2014/059056 | 4/2014 |
| WO | 2014/059057 | 4/2014 |
| WO | 2014/059058 | 4/2014 |
| WO | 2014/116395 | 7/2014 |
| WO | 2014/138166 | 9/2014 |
| WO | 2015/042501 | 3/2015 |
| WO | 2015/053807 | 4/2015 |
| WO | 2015/195854 | 12/2015 |
| WO | 2016/053933 | 4/2016 |
| WO | 2018/118767 | 6/2018 |

OTHER PUBLICATIONS

International Preliminary Report on Patentability issued in corresponding IA No. PCT/US2013/064187 dated Apr. 14, 2015.
International Search Report and Written Opinion issued in corresponding IA No. PCT/US2013/064187 dated Dec. 6, 2013.
International Preliminary Report on Patentability issued in corresponding IA No. PCT/US2013/064188 dated Apr. 14, 2015.
International Search Report and Written Opinion issued in corresponding IA No. PCT/US2013/064188 dated Dec. 20, 2013.

(56) References Cited

OTHER PUBLICATIONS

International Preliminary Report on Patentability issued in corresponding IA No. PCT/US2013/064189 dated Apr. 14, 2015.
International Search Report and Written Opinion issued in corresponding IA No. PCT/US2013/064189 dated Dec. 18, 2013.
International Preliminary Report on Patentability issued in corresponding IA No. PCT/US2013/064190 dated Apr. 14, 2015.
International Search Report and Written Opinion issued in corresponding IA No. PCT/US2013/064190 dated Dec. 6, 2013.
International Search Report and Written Opinion issued in corresponding IA No. PCT/US2014/020553 dated Jul. 3, 2014.
International Search Report and Written Opinion issued in corresponding IA No. PCT/US2015/036322 dated Sep. 16, 2015.
"Dual-Stage Transformable Adhesives: Bridging the Gap Between PSAs and Structural Adhesives," The Adherent Technology Insights from Adhesives Research, vol. 2, Issue 3, Dual Stage Adhesives, © 2012, 1 page.
A.M. Travelpiece et al., "Dielectric Integrity of High-Temperature Nanocomposites," 2008 Annual Report Conference on Electrical Insulation Dielectric Phenomena, © 2008 IEEE, pp. 571-574.
Dr. Graeme A. Roan et al., "Radiation Curable Pressure Sensitive Adhesives," Presented at the Pressure Sensitive Tape Council Conference, May 2004.
James R. Erikson et al., "Kraton Liquid™ Polymer/Solid Polymer Hybrid UV Cure Adhesives with Stable Peel Strength," http://www.pstc.org/files/public/Roan.pdf, Presented at the Pressure Sensitive Tape Council Conference, May 2002, pp. 229-243.
Jong-Yeol Shin et al., "Electrical Properties of the Epoxy Nano-Composites According to Additive," Transactions on Electrical and Electronic Materials, vol. 10, No. 3, Jun. 25, 2009, pp. 97-101.
Joseph V. Koleske et al., "2008 Additive Guide (Impact-Resistance Improved-Zeolites)," Paint & Coatings Industry 24.6, Jun. 2008.
Kyle R. Heimbach, "Transposable Adhesives: Acrylic Pressure Sensitive Adhesives with Reactive Components," Presented at the Pressure Sensitive Tape Council Conference, May 2013.

M. Spath, "First Experiments on Module Assembly Line Using Back-Contact Solar Cells," Presented at the 23rd European Photovoltaic Solar Energy Conference, Valencia, Spain, Sep. 1-5, 2008.
M.S. Sreekanth et al., "Effect of Concentration of Mica on Properties of Polyester Thermoplastic Elastomer Composites," Journal of Minerals & Materials Characterization & Engineering, vol. 8, No. 4, pp. 271-282, 2009.
Robert Wigdorski, "Taking Pressure Sensitive Adhesves to a Different Level of Performance," https://www.pstc.org/files/public/Wigdorski08.pdf, 2008.
A. Gragossian et al., "Lase Ablation of Aluminum from Normal Evaporation to Phase Explosion," Journal of Applied Physics 105, 103304, 2009.
L. Tunna et al., "Micromachining of copper using Nd: YAG laser radiation at 1064, 532, and 355 nm wavelengths," Optics & Laser Technology 33, pp. 135-143, 2001.
"Handbook of Pressure Sensitive Adhesive Technology," Edited by D. Satas, p. 172, 1989.
Alphonsus V. Pocius, "The Chemical and Physical Properties of Elastomer-Based Adhesives," Adhesion & Adhesives Technology: An Introduction, pp. 230-231, 245, 1997.
Yili Wu, "Pressure Sensitive Adhesives Based on Oleic Acid," A Thesis Submitted to Oregon State University, Presented Jan. 10, 2014.
International Search Report and Written Opinion issued in corresponding International Application No. PCT/US2016/016774 dated May 10, 2016.
Internationai Preliminary Report on Patentability issued in corresponding IA No. PCT/US2015/036322 dated Dec. 29, 2016.
International Preliminary Report on Patentability issued in corresponding IA. No. PCT/US2014/020553 dated Apr. 21, 2016.
International Preliminary Report on Patentability issued in corresponding International Application No. PCT/US2016/016774 dated Aug. 8, 2017.

\* cited by examiner

LABEL ASSEMBLIES FOR ADVERSE ENVIRONMENTS

FIELD

The present subject matter relates to label assemblies for use in adverse environments and particularly for applications in which a permanent bond is desired between a label and substrate.

BACKGROUND

Labels are used in many applications such as for example to provide information about a product or component. The information may include instructions for use of the product, supplier or manufacturer information, and/or safety information. In certain applications, local or national laws may require that labels containing such information be secured to a product and visible.

Frequently, in these and other applications, the product or component and its accompanying label(s) are exposed to adverse environmental conditions. For example, harsh weather may result in label(s) being exposed to rain, moisture, and cold temperatures. High temperatures are of particular concern as many labels degrade or detach from the surface to which they were previously adhered. High temperatures typically result from exposure to sunlight and/or heating from nearby sources such as machinery and vehicle engines for example.

Although adhesives are known which can withstand high temperatures, in many instances such adhesives are relatively costly. In addition, such adhesives may be difficult to apply.

Furthermore, it may be difficult to adhere or achieve long term attachment of a label to certain surfaces. Although viscous and/or thick adhesive coatweights can be used to counter the difficulties of adhering a label to an irregular or roughened surface, such adhesives may be inadequate upon exposure to adverse environments and particularly high temperatures. For example, many adhesives tend to flow or "ooze" upon exposure to high temperatures.

Accordingly, a need exists for label assemblies that can be adhered to a wide array of surfaces and which also can withstand exposure to adverse environments and particularly high temperatures.

SUMMARY

The difficulties and drawbacks associated with previous approaches are addressed in the present subject matter as follows.

In one aspect, the present subject matter provides a label assembly comprising a face layer defining a first face and an oppositely directed second face. The label assembly also comprises a two stage adhesive disposed on at least one of the first face and the second face. The two stage adhesive exhibits a first stage in which the adhesive is initially in the form of a pressure sensitive adhesive (PSA) and upon conversion to a second stage, the adhesive is in the form of a permanent, non-PSA adhesive.

In another aspect, the present subject matter provides a method of labeling an article. The method comprises providing an article having an outer surface. The method also comprises providing a label assembly including (i) a face layer defining a first face and an oppositely directed second face, and (ii) a two stage adhesive disposed on at least one of the first face and the second face. The two stage adhesive exhibits a first stage in which the adhesive is initially in the form of a pressure sensitive adhesive (PSA) and upon conversion to a second stage, the adhesive is in the form of a permanent, non-PSA adhesive. The method also comprises adhering the adhesive of the label assembly to the outer surface of the article.

In another aspect, the present subject matter provides a labeled article comprising an article having an outer surface, and a label assembly. The label assembly includes (i) a face layer defining a first face and an oppositely directed second face, and (ii) a two stage adhesive disposed on at least one of the first face and the second face. The two stage adhesive exhibits a first stage in which the adhesive is initially in the form of a pressure sensitive adhesive (PSA) and upon conversion to a second stage, the adhesive is in the form of a permanent, non-PSA adhesive.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
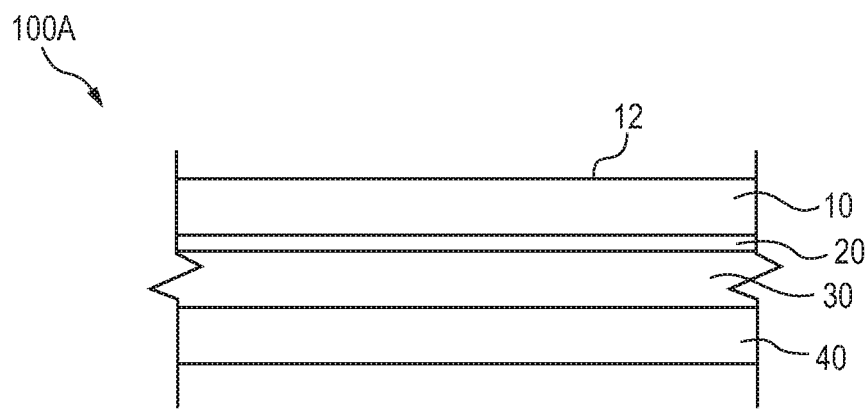
FIG. 1 is a schematic cross sectional illustration of a label assembly in accordance with an embodiment of the present subject matter.

The present subject matter provides a variety of label assemblies that are adapted for use in adverse conditions. The labels comprise a face or "face stock" layer, and a layer or region of a two stage adhesive, and an optional liner covering the adhesive layer. An optional primer layer may be utilized between the face layer and the adhesive. The same or a different primer layer may be utilized on an opposite side of the face layer, such as for example to promote printing thereon. One or more optional topcoat(s) can also be used along an outer surface of the face layer. Each of these components of the label assemblies are described in greater detail herein. The present subject matter also provides various methods of labeling articles and labeled articles.

Label Assemblies

Face Layers

A wide array of materials and combinations of materials can be used for the face layer(s) of the label assemblies. Generally, any material that is suitable for use in a label and which can survive 10 minutes of heat at 90° C. without any visible or mechanical degradation can potentially be used as a face layer material in the label assemblies of the present subject matter. Nonlimiting examples of materials that may be used in the face layers include poly(vinyl chloride) (PVC), poly(ethylene terephthalate) (PET), various polyolefins including polyethylene and polypropylene, polyamides, synthetic textiles, synthetic leathers, paper, fiber glass, polyvinylidene fluoride (PVF), metal foils such as aluminum and stainless steel, ceramics, natural leather, and combinations thereof. In many applications, the label assemblies of the present subject matter are useful as protective "overlam" films which are adhered over indicia or text-bearing surfaces to protect and preserve the underlying surface and/or text. In such applications, the face layer(s) are transparent or substantially so.

A representative, but non-exclusive, list of polyolefins suitable for use as the face layer includes polyethylene, polypropylene, polybutene (e.g., poly 1-butene), ethylene copolymers (such as linear low density polyethylene and other copolymers of ethylene and another monomer or monomers, e.g., hexene, butene, octene, etc.), propylene copolymers, butylene copolymers, and compatible blends thereof. For the purposes of this disclosure, two polymeric materials are considered to be "compatible" if they are capable of existing in close and permanent physical association without exhibiting gross symptoms of polymer segregation. A polymer blend that is heterogenous on a macroscopic level is considered to be incompatible.

In one embodiment, the face stock is a single extruded layer of crosslinked polyolefin or blend of polyolefins. For example, crosslinked linear low density polyethylene (LLDPE) face stocks can be used.

In another embodiment, the face stock comprises a unitary coextrudate: a plurality of coextruded layers of polymeric materials, typically thermoplastic polymers and/or polymer blends, adhered to each other in a substantially permanent state. An outer layer of the unitary coextrudate comprises a crosslinked polyolefin or polyolefin blend, as described above. The other layer or layers of the coextrudate are polymers selected for one or more desirable properties, e.g., strength, modulus, cost, etc. A representative, but non-exclusive, list of polymeric materials suitable as the other layer or layers of the face stock includes polyolefins, polyesters, nylons, polystyrenes, acrylonitrile butadiene rubbers, other extrudable thermoplastics, and compatible blends thereof.

A multilayer face stock can be prepared by simultaneously extruding a plurality of thermoplastic charges, at least one of which is a crosslinkable polyolefin or polyolefin blend serves as an outer layer of the face stock. Any suitable known type of coextrusion die can be used.

Depending on the particular polymeric materials used to form the coextruded face stock, in some embodiments, it is advantageous to extrude, simultaneously, one or more charges of material which become "tie" layers between coextruded layers. In particular, where two layers of material would not otherwise sufficiently adhere or bond to each other when coextruded, a "tie" layer is coextruded with and between the two layers, to hold them together in a substantially permanent unitary state. For example, nylon 6 and polyethylene can be coextruded to form a substantially permanent, unitary coextrudate by simultaneously extruding nylon 6, polyethylene, and a polymer having good affinity for both materials, such as a modified polyethylene or an ethylene vinyl acetate copolymer. Such a polymer becomes a "tie" layer between the nylon 6 and polyethylene layers. In general, the choice of "tie" layer material depends, at least in part, on various properties of the materials to be joined, or "tied," together, including, for example, the materials' polar vs. nonpolar nature, modulus, flow properties, etc.

In both the single layer and multilayer embodiments described above, the face stock is typically crosslinked in a conventional manner, after being extruded. In many embodiments, crosslinking is accomplished by electron beam irradiation. A variety of other electron accelerators are known and can be employed to crosslink the polyolefin outer layer.

In another embodiment, the face stock comprises a plurality of coextruded layers of polymeric material, including an outer layer of a heat resistant polymer such as nylon 6, polymethylpentene, polyethylene terephthalate, polybutylene terephthalate, copolyesters (such as KODAR THERMX crystallizable copolyester 6761, sold by Eastman Chemical Co.), polyamides, polyimides, and other polymers having a sufficiently high melting point or glass transition point. The other extruded layers of polymeric material are selected for their physical properties (e.g., strength, modulus, etc.) and/or cost. Nonlimiting examples of such polymeric materials include polyolefins, polyesters, nylons, polystyrenes, acrylonitrile butadiene rubbers, other extrudable thermoplastics, and compatible blends thereof.

The coextruded polymeric film face stock is prepared in a conventional manner by simultaneously extruding two or more charges of polymeric material, at least one of which is heat resistant, through a suitable extrusion die. One or more "tie" layers can be included within the coextruded face stock, as necessary to ensure adherence between layers, as described above.

In some embodiments, it is advantageous to include one or more fillers to one or more layers of the face stock in order to improve or impart desirable properties to the face stock. For example, fillers such as calcium carbonate, mica, talc, titanium dioxide, aluminum oxide, and the like, can be included in the melt of the pre-extruded polymeric material to impart opacity, strength, and/or other properties to the film. The incorporation of various fillers in extruded polymeric films is described in U.S. Pat. No. 4,713,273.

It will also be appreciated that, in some embodiments of the present subject matter, it is advantageous to hot-stretch the extruded polymeric films, prior to crosslinking, in order to provide machine direction orientation (MDO) of the film. A useful example of such hot-stretching is found in U.S. Pat. No. 4,713,273. In other applications, it is beneficial to biaxially orient the extruded films, prior to crosslinking. Biaxial orientation of thermoplastic films, like MDO, is known. Stretching the extruded films can improve the mechanical properties of the face stock, including its modulus and strength.

In many embodiments of the present subject matter the face layer(s) of the present subject matter label assemblies should exhibit low shrink properties, good UV stability, good UV flexo properties, good UV offset properties, good thermal transfer printability, relatively high resistance to chemical cleaning agents and in particular applications resistance to acidic agents, cooling agents, and the like. For applications in which the label(s) will be used in association with textiles, then the face layer(s) should exhibit resistance to detergents, dry cleaning agents, salt water, and resistance to scuffing.

The face layer(s) of the label assembly typically have a total thickness of from about 10 microns to about 400 microns, and particularly from 20 microns to 200 microns. Generally, face layer(s) of labels for automotive and textile applications are from 50 microns to 250 microns in thickness, and labels for electronic applications are from 20 microns to 150 microns in thickness. However, it will be appreciated that the present subject matter includes the use of face layer thicknesses less than and/or greater than these representative thicknesses.

combinations of acrylates and non-acrylates, (ii) one or more structural diluents, (iii) one or more radical addition diluents, and (iv) one or more additives such as (a) cross-linkers, (b) catalysts such as thermal catalysts and base catalysts, (c) photoinitiators including radical photoinitiators, UV radical photoinitiators and type I and II photoinitiators, (d) photosensitizers including dyes, and (e) stabilizers or process aids. An overview of the selections for the three main components (i)-(iii) is found in the following Table 1.

TABLE 1

Representative Listing of Main Components of Adhesive Compositions

| Radical Addition Diluents | Bodying Components | Structural Diluents |
|---|---|---|
| ACE | EB14-24 | S-21 |
| Isostearyl acrylate | EB14-15 | S-28 |
| Heptadecyl acrylate | EB14-16 | Epon 828 |
| Dicyclopentadiene acrylate | EB14-04 | Epon 834 |
| THF acrylate | EB14-02 | A-186 |
| OXE-10 | EB14-03 | A-187 |
| OXE-30 | M112, carbonate polyol | EP-10 |
| S-100 | EB13-97 | Desmolux D100 |
| Phenoxy ethylacrylate | EB-14-22 | Desmolux D200 |
| Urethane acrylate (less than 2000 daltons) | EB14-28 | Desmodur N3200 |
| Acrylic macromere (less than 10,000 daltons) | EB14-29 | Desmodur N100 |
| V2100 | EB14-33 | Desmodur N3300 |
| Cycloalphatic V2100 | EB14-40 | PPO oligomer (less than 5,000 daltons) |
| PAMA | EB14-41 | TMPO |
| Alkoxylated THF acrylate | Urethane Acrylate (more 2,000 daltons) | PEO oligomer (less than 5,000 daltons) |
| Hydroxyethyl acrylate | Acrylate macromere (more than 10,000 daltons) | 2EH oxetane |
| | PPO oligomer (more than 5,000 daltons) | Difunctional oxetane |
| | AS-2549 | Trimethylolpropane triacrylate (TMPTA) |
| | JRL4-128A | Tripropyleneglycol diacrylate (TPGDA) |
| | JRL4-128B | Ethoxylated (3 mol) bisphenol A diacrylate |
| | JRL4-128C | Ethoxylated (3 mol) trimethylolpropane triacrylate |
| | MJZ4-87-1 (EHA-VA-MA-S100) | Bisphenol A digylcidyl ether diacrylate |
| | MW1-65 (EHA-MA-S100) | |
| | MW1-69 (EHA-MA-E1020-S100) | |
| | MW1-91 (EHA-VA-MA) | |
| | MW1-93 (EHA-VA-MA-GMA) – best = MW1-101 | |
| | MW1-94 (Acrylated MW1-93) | |

Two Stage Adhesives

The various label assemblies of the present subject matter utilize one or more two stage adhesives. Typically, the adhesive(s) is disposed on the face layer(s) in the form of a layer or one or more regions. The two stage adhesives exhibit a first stage in which the adhesive is in the form of a pressure sensitive adhesive (PSA) and upon conversion to a second stage, the adhesive is in the form of a permanent, non-PSA adhesive.

In many embodiments, the two stage adhesives utilized in the present subject matter include (i) a bodying component, which may be acrylic based or non-acrylic based or include Details of these various components are provided herein.

Bodying Components

Bodying components are broadly defined herein as having a molecular weight (Mw) of at least 25,000 Daltons. The bodying component(s) may be present in the compositions of the present subject matter in an amount of 10-90 wt %, in certain embodiments 20-80 wt %, and in still other embodiments 30-70 wt %, alternately 5-70 wt %, alternately 40-60 wt %, alternately 30-50 wt %, alternately 5-15 wt %, alternately 10-15 wt %, or 80 wt %. The bodying components may be acrylic based bodying components or non-acrylic based bodying components. Combinations of these and potentially with other components can be used. The bodying components may have molecular weights (Mw) of 5,000 to 1,000,000, in certain embodiments 15,000-250,000, and in still other embodiments 15,000-100,000, alternately 1,000 to 500,000, in certain versions 1,000-100,000, and in still other versions 1,000-50,000, or alternately 18,000-70,000.

In certain embodiments of the present subject matter, particular acrylic based bodying components can be used as follows. It will be understood that the present subject matter includes the use of corresponding methacrylate monomers, oligomers, or components instead of, or in addition to, any of the noted acrylate monomers, oligomers, or components.

MJZ4-87-1: Bodying Component. This bodying component is a random acrylic copolymer with a number average molecular weight (Mn) of 50 k, (polydispersity index (PDI) 3.5, random copolymer) consisting of 55 wt % 2-ethylhexyl acrylate, 25 wt % vinyl acetate, 18 wt % methyl acrylate, and 2 wt % Additol™ S-100.

MW-65: Bodying Component. This bodying component is a random acrylic copolymer with Mn of 50 k, (PDI 3.5, random copolymer) consisting of 50 wt % 2-ethylhexyl acrylate, 48 wt % methyl acrylate and 2 wt % Additol™ S-100.

MW1-69: Bodying Component. This bodying component is a random acrylic copolymer with Mn of 50 k, (PDI 3.5, random copolymer) consisting of 44.9 wt % 2-ethylhexyl acrylate, 43.1 wt % methyl acrylate 43.1%, 10.2 wt % Elvacite™ 1020 (pMMA) and 1.8 wt % Additol™ S-100.

MW1-91: Bodying Component. This bodying component is a random acrylic copolymer with Mn of 50 k, PDI 3.5, random copolymer, consisting of 56.1 wt % 2-ethylhexyl acrylate, 25.5 wt % vinyl acetate, 18.4 wt % methyl acrylate.

MW1-93 (best example of synthesis is MW1-101). This bodying component is a random acrylic copolymer with Mn of 50 k, PDI 3.5, random copolymer consisting of 55 wt % 2-ethylhexyl acrylate, 25 wt % vinyl acetate, 18 wt % methyl acrylate, 2 wt % glycidyl ethacrylate.

MW1-94: Bodying Component. This bodying component is an adduct of acrylic acid and MW1-93, containing 98 wt % of MW1-93 and 2 wt % glycidyl methacrylate and a chromium (3+) catalyst.

Detailed formulations for certain bodying components presented in Table 1 are set forth in the following Table 2.

TABLE 2

Detailed Formulations of Bodying Components Used In Adhesive Compositions

| Component | Backbone | Monomer 1 | Monomer 2 | Monomer 3 | Monomer 4 | Functionality | Structure | Mw | Mn | PDI |
|---|---|---|---|---|---|---|---|---|---|---|
| AS-2549 | Acrylic | 51% 2EHA | 45% BA | | | 4% acid | random | 380961 | 61545 | 6.19 |
| Kh4-67 | Acrylic | 25% 2EHA | 72% EOEOEA | | | 3% epoxy | P-telechelic | 60441 | 20043 | 3.02 |
| Kh4-46 | Acrylic | 25% 2EHA | 72% EOEOEA | | | 3% alcohol | random | 36747 | 13301 | 2.76 |
| Kh4-105 | Acrylic | 25% 2EHA | 72% EOEOEA | | | 3% alcohol | p-telechelic | n/a | | |
| Kh4-37 | Acrylic | 50% BA | 50% EOEOEA | | | none | random | 54424 | 17337 | 3.14 |
| EB13-84 | Acrylic | 79% BA | 20% tBA | | | 1% alcohol | tadpole | 80987 | 53591 | 1.51 |
| LRK3-33 | Acrylic | 79% BA | 20% tBA | | | 1% alcohol | tadpole | 83000 | 37700 | 2.20 |
| LRK3-44 | Acrylic | 80% BA | 20% tBA | | | 0.4% alcohol | random | 81300 | 42960 | 1.89 |
| PP81-56 | Acrylic | 79% BA | 20% tBA | | | 1% alcohol | tadpole | 71000 | 37400 | 1.90 |
| PP81-67 | Acrylic | 80% BA | 20% tBA | | | 0.4% alcohol | random | 63500 | 35240 | 1.80 |
| KH4-18 | Acrylic | 78% BA | 19% tBA | | | 1.1% alcohol | random | 83726 | 58704 | 1.43 |
| 4240 | | | PPO | | | alcohol | Telechelic | 4000 | | |
| D2000 | | | PPO | | | primary amine | Telechelic | 2000 | | |
| EB14-24 | Acrylate | 48.22% BA | 48.22% tBA | | | 3.56% alcohol | P-telechelic | 54300 | 38100 | 1.43 |
| EB14-15 | Acrylate | 90.1% Butyl Acrylate | | | | 9.1% epoxy | P-telechelic | 129800 | 48500 | 2.68 |
| EB14-16 | Acrylate | 45.05% BA | 45.05% tBA | | | 9.1% epoxy | P-telechelic | 164400 | 48500 | 3.39 |
| EB14-04 | Acrylate | 40% BA | 40% tBA | | | 20% epoxy | random | 44700 | 19700 | 2.27 |
| EB14-02 | Acrylate | 80% BMA | | | | 20% epoxy | random | | n/a | |
| EB14-03 | Acrylate | 80% BA | | | | 20% epoxy | random | | n/a | |
| M112 | | | carbonate | | | alcohol | Telechelic | | | |
| EB13-97 | Acrylate | 80% BA | | | | 20% epoxy | random | 40800 | 12300 | 3.32 |
| EB14-22 | Acrylate | 96.44% BA | | | | 3.56% alcohol | P-telechelic | 60700 | 36000 | 1.69 |
| EB14-28 | Acrylate | 48.22% BA | 48.22% tBA | | | 3.56% alcohol | P-telechelic | 27300 | 18700 | 1.46 |
| EB14-29 | Acrylate | 48.22% BA | 48.22% tBA | | | 3.56% alcohol | P-telechelic | | n/a | |
| EB14-33 | Acrylate | 90.9% BA | | | | 9.1% epoxy | P-telechelic | | n/a | |
| EB14-40 | Acrylate | 48.22% BA | 48.22% tBA | | | 3.56% alcohol | P-telechelic | | n/a | |
| EB14-41 | Acrylate | 48.56% BA | 48.56% tBA | | | 2.88% alcohol | P-telechelic | | n/a | |
| Urethane Acrylate (Mw >2000) | | | Urethane | | | | | | | |
| Acrylate macromer (Mw >10000) | | | Acrylate | | | | | | | |
| PPO oligomer (Mw >5000) | | | PPO | | | | | | | |
| MJZ4-87-1 | Acrylic | 55% 2-EHA | 25% vinyl acetate | 18% methyl acrylate | 2% S-100 | 2% epoxy | Random | 50000 | 175000 | 3.5 |
| MW-65 | Acrylic | 50% 2-EHA | 48% methyl acrylate | 2% S-100 | | 2% epoxy | Random | 50000 | 175000 | 3.5 |
| MW1-69 | Acrylic | 44.9% 2-EHA | 43.1% methyl acrylate | 10.2% Elvacite 1020 | 1.8% S-100 | 1.8% epoxy | random | 50000 | 175000 | 3.5 |
| MW1-91 | Acrylic | 56.1% 2-EHA | 25.5% vinyl acetate | 18.4% methyl acrylate | | none | random | 50000 | 175000 | 3.5 |

TABLE 2-continued

Detailed Formulations of Bodying Components Used In Adhesive Compositions

| Component | Backbone | Monomer 1 | Monomer 2 | Monomer 3 | Monomer 4 | Functionality | Structure | Mw | Mn | PDI |
|---|---|---|---|---|---|---|---|---|---|---|
| MW1-93 | Acrylic | 55% 2-EHA | 25% vinyl acetate | 18% methyl acrylate | 2% glycidyl methacrylate | 2% epoxy | Random | 50000 | 175000 | 3.5 |
| MW1-94 | Acrylate | 98% MW1-93 | 2% Acrylic Acid | | | 2% acrylate | random | 50000 | 175000 | 3.5 |

Abbreviations in the preceding Table 2 include BA: butyl acrylate; 2-EHA: 2-ethylhexyl acrylate; tBA: tert-butyl acrylate; EOEOEA: ethoxyethoxyethylacrylate; PPO: polypropylene oxide, BMA: butyl methacrylate.

Radical Addition Diluents

Radical addition diluents are acrylic based monomers having a molecular weight (Mw) of generally less than 25,000 and/or generally having a viscosity below 25,000 cps at 25° C. Radical addition diluents are periodically referred to herein as reactive diluents. Radical addition diluents are present in the compositions of the present subject matter in an amount of 10-80 wt %, in certain embodiments 50-70 wt %, alternately 10-60 wt %, alternately 5-70 wt %, alternately 0-40 wt %, in still other embodiments 30-40 wt %, or alternately 7-25 wt %. Radical addition diluents can include a (meth)acrylate monomer and in certain versions have an overall Mw of less than 10,000 Daltons. Examples of useful radical addition diluents herein include ACE, isostearyl acrylate, heptadecyl acrylate, dicyclopentadiene acrylate, THF acrylate, alkoxylated THF acrylate, hydroxyethyl acrylate, phenoxy ethylacrylate, urethane acrylate (Mw<2000), OXE-10, OXE-30, S-100, V2100, Cycloaliphatic V2100, and PAMA. Many of these components are described in greater detail herein in association with the Examples. Examples of several radical addition diluents are set forth in detail below.

Alkoxylated THF acrylate, is a low viscosity monofunctional monomer available from Sartomer as CD-611, where n is not disclosed, and which is shown below as formula (1):

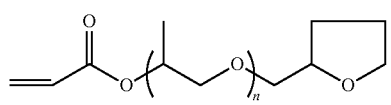
(1)

Hydroxyethyl acrylate: This radical addition diluent is shown below as formula (2):

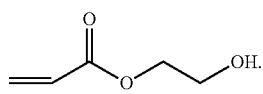
(2)

Phenoxy ethyl acrylate: This radical addition diluent is shown below as formula (3):

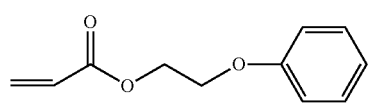
(3)

This low viscosity monofunctional monomer is available from Sartomer as SR339.

Tetrahydrofurfuryl acrylate (THFA or THF acrylate): This radical addition diluent is shown below as formula (4). This low viscosity monofunctional monomer is available from Sartomer as SR285.

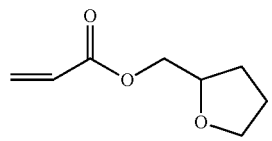
(4)

Structural Diluents

Structural diluents may be present in the compositions of the present subject matter in an amount of 5-80 wt %, alternately 5-50 wt %, in certain embodiments 10-50 wt %, alternately 5-40 wt %, alternately 10-30 wt %, alternately 20-40 wt %, alternately 65-95 wt %, alternately 75-85 wt %, alternately 75-95 wt %, alternately 7-25 wt %, alternately 45-65 wt %, alternately 45-60 wt %, alternately 75-85 wt %, and alternately 15-20 wt %. Structural diluents are periodically referred to herein as structural components. Various structural diluents and details are described in association with the Examples herein.

Various structural diluents include the following: Trimethylolpropane triacrylate (TMPTA). This monomer is available from Sartomer as SR351 and shown below as formula (5):

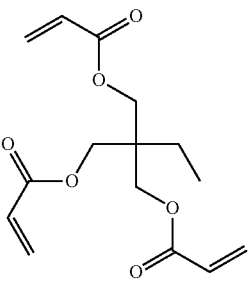
(5)

Tripropyleneglycol diacrylate, available from Sartomer as SR306 and shown below as formula (6):

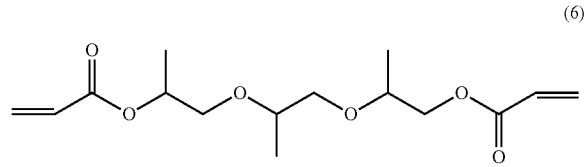 [SMILES: C=CC(=O)OCC(C)OCC(C)OCC(C)OC(=O)C=C]

(6)

Ethoxylated (3 mol) bisphenol A diacrylate. This monomer is available from Sartomer as SR349 where n+m=3, and is shown below as formula (7):

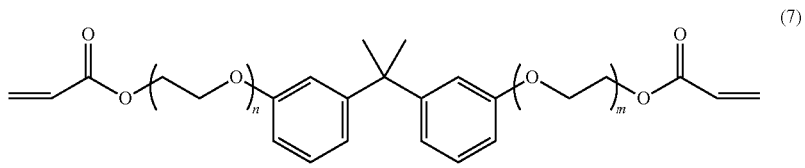

(7)

Ethoxylated (3 mol) trimethylolpropane triacrylate, and shown below as formula (8):

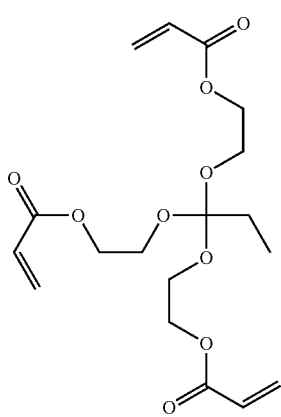

(8)

This monomer is available from Sartomer as SR454.

Bisphenol A diglycidyl ether diacrylate is shown below as formula (9):

bisphenol A digylcidyl ether diacrylate. The value x is from 1 to 10, in certain embodiments from 1 to 5, and in still other embodiments 3.

Ring opening structural components can also be used in certain embodiments. Suitable ring opening structural components include S-21, S-28, Epon 828, Epon 834, Silquest® A-186 and Silquest® A-187. Also useful are epoxies, oxetanes, anhydrides, and lactams.

Cationically polymerizable monomers include epoxy-containing materials, alkyl vinyl ethers, cyclic ethers, styrene, divinyl benzene, vinyl toluene, N-vinyl compounds, 1-alkyl olefins (alpha-olefins), lactams and cyclic acetals.

Epoxy-containing materials that can be cured or polymerized by the catalyst system of this subject matter are those known to undergo cationic polymerization and include 1,2-, 1,3-, and 1,4-cyclic ethers (also designated as 1,2-, 1,3-, and 1,4-epoxides). The 1,2-cyclic ethers are useful in certain versions of the present subject matter.

Cyclic ethers that can be polymerized in accordance with this subject matter include those described in Frisch and Reegan, *Ring-Opening Polymerizations*, Vol. 2 (1969). Suitable 1,2-cyclic ethers are the monomeric and polymeric types of epoxides. They can be aliphatic, cycloaliphatic, aromatic, or heterocyclic and will typically have an epoxy equivalence of from 1 to 6, and in certain embodiments 1 to 3. Particularly useful are the aliphatic, cycloaliphatic, and glycidyl ether type 1,2-epoxides such as propylene oxide, epichlorohydrin, styrene oxide, vinylcyclohexene oxide, vinylcyclohexene dioxide, glycidol, butadiene oxide, diglycidyl ether of bisphenol A, cyclohexene oxide, 3,4-epoxy-cyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups.

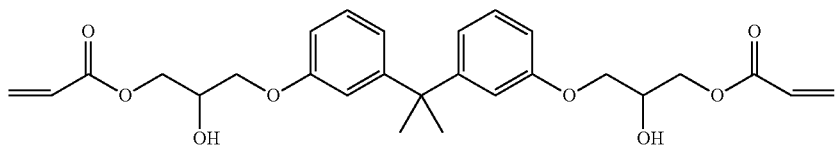

(9)

This monomer is available from Cytec as Ebecryl 600.

Radical structural components include one or more curable materials including a homopolymer having a Tg>0° C. Such suitable components include trimethylolpropane triacrylate (TMPTA), ethoxylated (x mol) bisphenol A diacrylate, ethoxylated (x mol) trimethylolpropane triacrylate, and A wide variety of commercial epoxy resins are available and listed in Lee and Neville, *Handbook of Epoxy Resins*, (1967) and in P. Bruins, *Epoxy Resin Technology*, (1968). Representative of the 1,3- and 1,4-cyclic ethers which can be polymerized in accordance with this subject matter are oxetane, 3,3-bis(chloromethyl)oxetane, and tetrahydrofuran.

In particular, cyclic ethers which are readily available include propylene oxide, oxetane, epichlorohydrin, tetrahydrofuran, styrene oxide, cyclohexene oxide, vinylcyclohexene oxide, glycidol, octylene oxide, phenyl glycidyl ether, 1,2-butane oxide, diglycidyl ether of bisphenol A (e.g., Epon 828 and DER 331), vinylcyclohexene dioxide (e.g., ERL-4206), 3,4-epoxycyclohexylmethyl-3,4-epoxycyclohexanecarboxylate (e.g., ERL-4221), 3,4-epoxy-6-methylcyclohexylmethyl-3,4-epoxy-6-methylcyclohexanecarboxylate (e.g. ERL-4201), bis(3,4-epoxy-6-methylcyclohexylmethyl) adipate (e.g., ERL-4299), aliphatic epoxy modified with polypropylene glycol (e.g., ERL-4050 and ERL-4052), dipentene dioxide (e.g., ERL-4269), epoxidized polybutadiene (e.g., Oxiron 2001), silicone epoxy (e.g., Syl-Kem 90), 1,4-butanediol diglycidyl ether (e.g., Araldite RD-2), polyglycidyl ether of phenolformaldehyde novolak (e.g., DER-431), Epi-Rez 521 and DER-438), resorcinol diglycidyl ether (e.g., Kopoxite), polyglycol diepoxide (e.g., DER-736), polyacrylate epoxide (e.g., Epocryl U-14), urethane modified epoxide (e.g., QX3599), polyfunctional flexible epoxides (e.g., Flexibilizer 151), and mixtures thereof as well as mixtures thereof with co-curatives, curing agents or hardeners which also are known (see Lee and Neville and Bruins, supra). Representative of the co-curatives of hardeners that can be used are acid anhydrides such as nadic methyl anhydride, cyclopentanetetracarboxylic dianhydride, pyromellitic anhydride, cis-1,2-cyclohexanedicarboxylic anhydride, and mixtures thereof.

Cationically-polymerizable monomers useful in the present subject matter include but are not limited to epoxy-containing materials, alkyl vinyl ethers, cyclic ethers, styrene, divinyl benzene, vinyl toluene, N-vinyl compounds, cyanate esters, 1-alkenes (alpha olefins), lactams and cyclic acetals.

Additional cationically-polymerizable monomers are described in U.S. Pat. No. 5,252,694 at col. 4, line 30 through col. 5, line 34. Particular monomers of this class include EPON® 828, and EPON® 1001F and the ERL series of cycloaliphatic epoxy monomers such as ERL-4221® or ERL-4206®. Particularly useful monomers are the ERL series because of their lower cure temperatures.

Certain lactones may be useful in the present subject matter. The lactones which can used as comonomers in the present subject matter include those shown below with formulas (10)-(12):

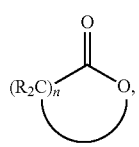
(10)

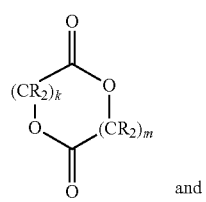
and
(11)

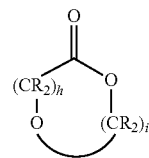
(12)

wherein n is 4 or 5, h, i, k, and m are independently 1 or 2 and each R is independently chosen from H or hydrocarbyl containing up to 12 carbon atoms. Particular lactones are those in which R is hydrogen or methyl, and in certain embodiments particularly useful lactones are e-caprolactone, d-valerolactone, glycolide (1,4-dioxan-2,5-dione), 1,5-dioxepan-2-one and 1,4-dioxan-2-one.

An additional class of diluent that may be employed in the present subject matter is a ring-opening monomer diluent. Such a diluent is also non-reactive with the other reactants under conditions of free radical polymerization employed and which is capable of undergoing ring opening subsequent to formation of the acrylate polymer during the curing step. Such ring-opening diluents comprise, without limitation, lactones, lactams, cyclic ethers and cyclic siloxanes represented by the following general formulas shown below as (13)-(16):

(13)

(14)

(15)

(16)

In formulas (13)-(16), x ranges from, for example, 3 to 11, and in certain versions 3-6 alkylene groups.

U.S. Pat. No. 5,082,922 describes the use of ring-opening monomers as diluents in the solvent-free formation of polymers from ethylenically unsaturated monomers. However, this patent describes a single step reaction of the monomers together with the ring-opened diluent. This differs from the two step strategy of certain methods of the present subject matter which provide for the initial formation of the polymer from ethylenically unsaturated monomers followed by curing of the diluent in the presence of the thus-formed polymer. The noted patent provides for use of reaction conditions such as temperatures of at least 150° C. which support both reactions in a single step.

Useful ring-opening monomer diluents include but are not limited to butyrolactone, valerolactone, caprolactone, methy-butyrolactone, butyrolactam, valerolactam, caprolactam and siloxanes.

A siloxane ring opening monomer is Siloquest® A-186, which acts as a ring opening cured structural component as well as a silane functional structural component through silane-silane condensation reaction. Siloquest® A-186 (beta (3,4-epoxycyclohexyl) ethyltrimethoxysilane) has the following formula (17):

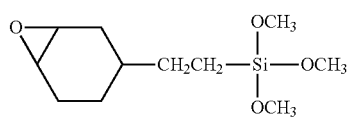 (17)

Beta-(3,4-Epoxycyclohexyl)ethyltrimethoxysilane

While the polymerization reaction may be carried out in the presence of a non-reactive solvent, the reaction can advantageously occur in the substantial absence of a solvent. In certain embodiments, the solvent will be present in an amount of up to about 10 percent by weight, and preferably no more than 5 percent by weight, based on the total weight of the reactants. The solvent may be removed from the product of the diluent reaction step (such as by heating). Exemplary non-reactive solvents include ketones, alcohols, esters and hydrocarbon solvents, such as ethyl acetate, toluene and xylene.

Oxazolines, or oxazolidines, useful in the present subject matter include those having the following formulas (18)-(19):

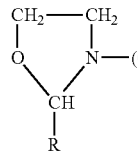 and

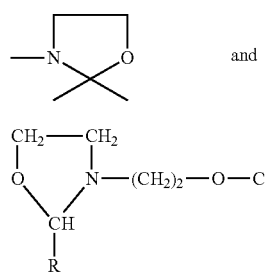 (19)

where R represents a branched, saturated, aliphatic hydrocarbon radical containing 5 to 8 carbons. Another suitable oxazoline is shown below as (20):

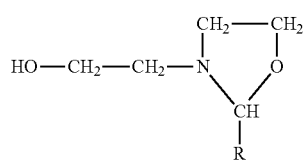 (20)

where R represents a branched, saturated, aliphatic hydrocarbon radical containing 5 to 8 carbons.

The oxazolidine mixtures useful herein generally have a viscosity of less than 8,000, and in certain versions, less than 6,500 mPa·s at 23° C. and, thus, are suitable as solventless hardeners for polymer precursors containing isocyanate groups. In combination with polymer precursors containing isocyanate groups, they are suitable for the production of solventless or low solvent, one-component systems which, in turn, are suitable as binders for high quality paints, coating compositions or sealing compositions. These systems are generally cured after application by exposure to atmospheric moisture. Polymer precursors containing isocyanate groups which are suitable for the production of these systems include the organic polyisocyanates or isocyanate prepolymers described, e.g., U.S. Pat. No. 4,002,601. Generally the oxazolines useful herein are described in U.S. Pat. No. 5,189,176.

In certain embodiments, bismaleimides can be used. The bismaleimides that may be used in the present subject matter are organic compounds containing two maleimide groups and are prepared generally from maleic anhydride and diamines. Bismaleimides may be described by the general formula of (21) as follows:

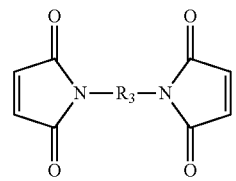 (21)

wherein $R^3$ is a divalent aromatic or alicyclic organic group. In certain versions, useful bismaleimides are derived from aromatic diamines and particularly are those wherein $R^3$ is a polynuclear aromatic radical. Examples of such bismaleimides include 2,2-bis(4-aminophenoxy-4-phenyl) propane bismaleimide, 4,4'-bis(3-amino phenoxy) diphenyl sulfone bismaleimide, 1,4-bis(3-aminophenyl isopropylidene) benzene bismaleimide and bis(4-aminophenyl) methane bismaleimide. The bismaleimides may be used singly or as mixtures.

It is also possible to use bismaleimides in which up to 50% of the maleimide groups have been replaced by substituted maleimide groups such as methyl maleimides or halomaleimides or by the nadimide, methyl nadimide, or isomaleimide groups. Portions of the maleimide groups may also be replaced by succinimide, phthalimide, or substituted succinimide and phthalimide groups.

The bismaleimide may be prepared by a number of well known methods from maleic anhydride and diamines, and a great many are readily available from commercial sources.

As previously noted, in certain aspects of the present subject matter, one or more components of the compositions such as the bodying components can be non-acrylic based bodying components. A wide array of non-acrylic based components can be used. Nonlimiting examples include polyolefins, polyvinyl aromatics, polyurethanes, polycarbonates, polyesters, polyethers, and combinations of these and potentially with one or more other agents and/or components. A particular nonlimiting example of a polyvinyl aromatic is polystyrene.

Various additives and initiators are useful with the adhesives and compositions of the present subject matter. Periodically, the term "curative" is used herein. That term refers to an agent(s) or stimulus that promotes or causes polymerization of the polymer(s) in the subject composition. Thus, the term curative includes a single agent, a single stimulus, multiple agents, multiple stimuli, combinations of agents, combinations of stimuli, and combinations of one or more agents with one or more stimuli. Generally, the curative(s) is activable, i.e., activatable, by at least one of radiation, heat, moisture, pressure, ultrasound, exposure to chemical agents, and combinations thereof. Typically, the term curative as used herein refers to catalysts and/or photoinitiators. However, it will be appreciated that the term may include a wide array of other agents (and stimuli).

Thermal Catalysts. The catalysts herein may be external or internal. Catalysts may be used in an amount of 0-10 wt %, 0.1-10 wt %, 0-5 wt %, 0.1-5 wt %, 0-4 wt %, 0.1-4 wt %, 0-2 wt %, 0.1-2 wt %, or 0.01-2 wt %. Suitable catalysts include blocked strong acid catalysts, which are based on acids consisting of, for example trifluoromethanesulfonic acid (triflic acid), dinonylnaphthalene sulfonic acid (DSA), dinonylnaphthalene disulfonic acid (DDSA), hexafluoro phosphate, and ammonium antimony hexafluoride (a Lewis acid), and are available from King Industries for example as K-Pure® CXC 1615 (diethylamine salt of trifluoromethane-sulfonic acid), Nacure® 155 (a blocked acid catalyst based on DNNDSA), K-Pure® CXC 1612 (ammonium antimony hexafluoride), Nacure® Super-A218 (zinc salt of trifluoromethanesulfonic acid), K-Pure® CXC 1738 (ammonium hexafluorophosphate), and K-Pure® CXC 1614 (ammonium trifluoromethanesulfonic acid).

Base catalysts can be primary, secondary or tertiary amines. A suitable primary diamine is diamino diphenyl sulfone. Other bases include imidizoles and ketimines. Suitable imidizoles include 2-methyl imidizole, 2-ethyl 4-methyl imidizole, 2-phenyl imidizole. A listing of imidizole curatives are found in US Patent Application Publication No. 2009/0194320, paragraph [0045]. A latent base curative is dicyandiamide [DICY].

Photoinitiators. Photoinitiators include radical photoinitiators and UV radical photoinitiators. Photoinitiators may be present in the compositions of the present subject matter in amounts of 0-10 wt %, 0.01-10 wt %, 2-5 wt %, or 1-3 wt %.

Radical Photoinitiators. Thermal initiators include t-butyl peroxy 2-ethyl hexanoate, t-butyl peroxy pivalate, t-amylperoxy-2-ethyl hexanoate, Benzoyl Peroxide, t-amyl peroxybenzoate, t-butyl peroxy acetate, and Azo compounds sold under the trade name Vazo, such as for example Vazo 52, Vazo 67, and Vazo 88.

UV Radical Photoinitiators. The photoinitiators which are suitable in the present subject matter include both type I and type II photoinitiators.

Type I photoinitiators are defined to essentially undergo a unimolecular bond cleavage reaction upon irradiation thereby yielding free radicals. Suitable type I photoinitiators are selected from a group consisting of benzoin ethers, benzil ketals, alpha-dialkoxy-acetophenones, α-hydroxyalkylphenones and acyl-phosphine oxides. Suitable type I photoinitiators are commercially available, for example, as Esacure KIP 100 from Lamberti Spa, Gallarate, Italy, or as Irgacure 651 from Ciba-Geigy, Lautertal, Germany.

In general, the type I photoinitiator compounds suitable herein are selected from a group consisting of benzoin ethers, benzil ketals, α-dialkoxy-acetophenones, α-hydroxyalkylphenones and acyl-phosphine oxides.

Type II photoinitiators are defined to essentially undergo a bimolecular reaction where the photoinitiators interact in an excited state with a second compound acting as co-initiator, to generate free radicals. Suitable type II photoinitiators are selected from a group comprising benzophenones, thioxanthones and titanocenes. Suitable co-initiators are preferably selected from a group consisting of amine functional monomers, oligomers or polymers whereby amino functional monomers and oligomers are used in certain embodiments. Both primary, secondary and tertiary amines can be used whereby tertiary amines are used in certain embodiments. Suitable type II photoinitiators are commercially available, for example, as Esacure TZT from Lamberti Spa, Gallarate, Italy, or as 2- or 3-methylbenzophenone from Aldrich Co., Milwaukee, Wis., USA. Suitable amine co-initiators are commercially available, for example, as GENOMER® 5275 from Rahn A G, Zurich, Switzerland.

Specific examples of type II photoinitiator compounds include benzophenones and thioxanthones. In a particular embodiment, co-initiator compounds such as amines may be present and may interact with the type II photoinitiator compounds.

Crosslinkers. The crosslinkers useful herein include radiation activatable crosslinking agents, which are selected from the group consisting of aldehydes, ketones, quinones, thioxanthones, and s-triazines. Metal chelate crosslinker catalysts are also envisioned. The crosslinkers may be present in the compositions of the present subject matter in an amount of 2 to 95 wt %, 0-4 wt %, 0.01-4 wt %, 0.01-2 wt %, 0-2 wt %, 0.01-1 wt %, 0-1 wt %, 0.01-0.5 wt %, or 0-0.5 wt %.

Photosensitizers. Each sensitizer tends to have its own characteristic response in the visible and ultraviolet light spectrum, so they may be used in combination to broaden the light response and/or increase the speed of response to exposure to light.

Photosensitizers may be used in the compositions of the subject matter in amounts such as 0-15 wt %, 0-01-15 wt %, 0-10 wt %, 0.01-10 wt %, 0-5 wt %, 0.01-5 wt %, 0-2 wt %, 0.01-2 wt %, 0-1 wt, and 0.01-1 wt %. Photosensitizers may be sensitizing dyes.

Illustrative sensitizing dyes are those in the following categories: diphenylmethane, xanthene, acridine, methine and polymethine, thiazole, thiazine, azine, aminoketone, porphyrin, colored aromatic polycyclic hydrocarbons, thioxanthenones p-substituted aminostyryl compounds and aminotriaryl methanes.

Stabilizers and Processing Aids. Several categories of stabilizers and processing aids are envisioned, including oils/waxes, antioxidants, photosensitizers, rheology modifiers, fillers, radical structural components, ring opening structural components, epoxies, oxetanes, anhydrides, lactams, lactones, oxazolines, isocyanates, bismaleimides, and azodioxides. Stabilizers and process aids are used in the compositions of the subject matter in amounts such as 0-10 wt %, 0.1-10 wt %, 0-4 wt %, 0.1-4 wt %, 0-3 wt % and 0.1-3 wt %. In certain embodiments, it may be useful to utilize an azodioxide as a stabilizer. An example of such is the stabilizer commercially available from Hampford Research, Inc. of Stratford, Conn., under the designation UVTS-52. UVTS-52 is a thermally reversible azodioxide. UVTS-52 (CAS 34122-40-2) is believed to be 1,4,4-trimethyl-2,3-diazabicyclo-[3.2.2]-non-2-ene-2,3-dioxide.

Plasticizers—Oils and waxes. Suitable plasticizers include plasticizing oils, such as mineral oil, but also olefin oligomers and low molecular weight polymers, or glycol benzoates, as well as vegetable and animal oil and derivatives of such oils. The petroleum-derived oils that may be employed are relatively high boiling temperature materials containing only a minor proportion of aromatic hydrocarbons. In this regard, the aromatic hydrocarbons should in certain embodiments be less than 30%, and more particularly less than 15%, by weight, of the oil. Alternately, the oil may be fully non-aromatic. Suitable oligomers included as plasticizers may be polypropylenes, polybutenes, hydrogenated polyisoprene, hydrogenated butadiene, or the like having average molecular weights between about 100 and about 10,000 g/mol. Suitable vegetable and animal oils include glycerol esters of the usual fatty acids (for example, stearic, oleic, linoleic, linolenic) and polymerization products thereof. Other plasticizers may be used provided they have suitable compatibility. Nyflex® 222B, a naphthenic mineral oil manufactured by Nynas Corporation, has also been found to be an appropriate plasticizer. As will be appreciated, plasticizers have typically been employed to reduce the viscosity of the overall adhesive composition without substantially decreasing the adhesive strength and/or the service temperature of the adhesive. The choice of plasticizer can be useful in formulation for specific end uses (such as wet strength core applications). Because of economics involved in production and in material cost, as plasticizers are usually of lower cost than other materials involved in the formulation like polymers and tackifying resins, the amount of plasticizer in the adhesive should be maximized for cost considerations.

Waxes in amounts of 0% to 20% by weight or 0.1-20 wt %, or 0.1-15 wt %, can also be used in the adhesive compositions, and are used to reduce the melt viscosity of the adhesives without appreciably decreasing their adhesive bonding characteristics. These waxes also are used to reduce the open time of the composition without affecting the temperature performance.

Examples of useful wax materials include the following.

Low molecular weight (100-6000 g/mol) polyethylene having a hardness value, as determined by ASTM method D-1321, of from about 0.1 to 120 and ASTM softening points of from about 66° C. to 120° C. can possibly be used.

Petroleum waxes such as paraffin wax having a melting point of from about 130° F. to 170° F. and microcrystalline wax having a melting point of from about 135° F. to 200° F., the latter melting points being determined by ASTM method D 127-60 can possibly be used.

Atactic polypropylene having a Ring and Ball softening point of from about 120° to 160° C. can potentially be used.

Metallocene catalyzed propylene-based wax under the name "Licocene" commercialized by Clariant International, Ltd., Muttenz, Switzerland, can possibly be used.

Metallocene catalyzed wax or single-site catalyzed wax like for example those described in U.S. Pat. Nos. 4,914,253 and 6,319,979, and WO 97/33921 and WO 98/03603 can potentially be used.

Paraffin waxes, microcrystalline waxes, polyethylene waxes, polypropylene waxes, by-product polyethylene waxes, synthetic waxes made by polymerizing carbon monoxide and hydrogen such as Fischer-Tropsch waxes, oxidized Fischer-Tropsch waxes, functionalized waxes, and mixtures thereof, can possibly be used.

Polyolefin waxes. As used herein, the term "polyolefin wax" refers to those polymeric or long-chain entities comprised of olefinic monomer units. These materials are commercially available from Westlake Chemical Co. under the trade name "Epolene."

The materials which are used in certain embodiments of the present subject matter have a Ring and Ball softening point of 200° F. to 350° F. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, etc., and which are solid at ambient temperature by virtue of their being hydrogenated, have also been found to be useful with respect to functioning as a wax material equivalent. These hydrogenated materials are often referred to in the adhesives industry as "animal or vegetable waxes."

Antioxidants. The adhesive also typically includes about 0.1% to about 5% of a stabilizer or antioxidant. The stabilizers which are useful in the adhesive compositions of the present subject matter are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. In certain embodiments, a particularly useful antioxidant is Irganox 1010, a tetrakis(methylene(3,5-di-teri-butyl-4-hydroxyhydrocinnamate))methane manufactured by Ciba-Geigy. Among the applicable stabilizers are high molecular weight hindered phenols and multifunctional phenols, such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity. This steric hindrance thus provides the phenolic compound with its stabilizing properties. Representative hindered phenols include:

1,3,5-trimemyl-2,4,6-tris(3-5-di-tert-butyl-4-hydroxybenzyl) benzene;

pentaerythritol tetrakis-3(3,5-di-tert-butyl-4-hydroxyphenyl) propionate;

n-octadecyl-3(3,5-ditert-butyl-4-hydroxyphenyl) propionate;

4,4'-methylenebis(4-methyl-6-tert butylphenol);

4,4'-thiobis(6-tert-butyl-o-cresol);

2,6-di-tert-butylphenol;

6-(4-hydroxyphenoxy)-2,4-bis(n-ocytlthio)-1,3,5-triazine;

2,4,6-tris(4-hydroxy-3,5-di-tert-butyl-phenoxy)-1,3,5-triazine;

di-n-octadecyl-3,5-di-tert-butyl-4-hydroxybenzylphosphonate;

2-(n-octylthio)ethyl-3,5-di-tert-butyl-4-hydroxybenzoate; and sorbitol hexa-(3,3,5-di-tert-butyl-4-hydroxy-phenyl) propionate.

The performance of these stabilizers may be further enhanced by utilizing, in conjunction therewith; (1) synergists such as, for example, as thiodipropionate esters and phosphites; and (2) chelating agents and metal deactivators as, for example, ethylenediaminetetraacetic acid, salts thereof, and disalicylalpropylenediimine.

Ultraviolet Inhibitors. Antioxidants may be used to retard the oxidative attack on the adhesive composition, which can result in loss of the adhesive and cohesive strength of adhesive composition. Useful antioxidants include but are not limited to amines, such as N—N'-di-beta-naphthyl-1,4-phenylenediamine, available as AGERITE D, phenolics, such as 2,5-di-(t-amyl) hydroquinone, available as SANTO- VAR A, from Monsanto Chemical Co., tetrakis[ethylene 3-(3',5'-di-tert-butyl-4'-hydroxyphenyl)propianate]methane, available as IRGANOX 1010 from Ciba-Geigy Corp., and 2-2'-methylenebis(4-methyl-6-tert butyl phenol), available as ANTIOXIDANT 2246, and dithiocarbamates, such as zinc dithiodibutyl carbamate.

Rheology Modifiers. Rheology modifiers can be added to change the thixotropic properties of the composition. Suitable rheology modifiers include polyamide waxes, fumed silica, flow control additives, reactive diluents, anti-settling agents, alpha-olefins, hydroxyl-terminated silicone-organic copolymers, including but not limited to hydroxyl-terminated polypropyleneoxide-dimethylsiloxane copolymers, and combinations thereof.

Fillers. Fillers can be used to impart strength or reduce overall cost. Useful fillers herein include aluminum trihydroxide, calcium hydroxide, expandable microspheres sold under the trade name Expancel®, carbon black, titanium dioxide or nickel coated glass spheres.

In certain versions of the present subject matter, a filler, rheology modifier and/or pigment is present in the adhesive. These can perform several functions, such as modifying the rheology of the adhesive in a desirable way, absorbing moisture or oils from the adhesive or from a substrate to which it is applied, and/or promoting cohesive, rather than adhesive, failure. Other examples of such materials include calcium carbonate, calcium oxide, talc, coal tar, textile fibers, glass particles or fibers, aramid pulp, boron fibers, carbon fibers, mineral silicates, mica, powdered quartz, bentonite, wollastonite, kaolin, fumed silica, silica aerogel or metal powders such as aluminum powder or iron powder. Among these, calcium carbonate, talc, calcium oxide, fumed silica and wollastonite are particularly useful, either singly or in some combination, as these often promote the desired cohesive failure mode.

A description of useful pressure-sensitive adhesives and properties may be found in Encyclopedia of Polymer Science and Engineering, Vol. 13. Wiley-Interscience Publishers (New York, 1988). Additional description of useful pressure-sensitive adhesives and their characteristics may be found in Encyclopedia of Polymer Science and Technology, Vol. 1, pp. 476-546, Wiley-Interscience Publishers, 2nd Ed. (New York, 1985).

The adhesive layer is typically applied at a coatweight of from about 10 g/m$^2$ to about 50 g/m$^2$. For applications in which the labels are used as protective "overlam" films, an adhesive coatweight of from 10 g/m$^2$ to 20 g/m$^2$ and particularly 15 g/m$^2$ can be used. For applications in which the labels are used as washing tags, an adhesive coatweight of from 20 g/m$^2$ to 30 g/m$^2$ can be used. For applications in which the labels are used as vulcanization labels, a coatweight of from 20 g/m$^2$ to 40 g/m$^2$ can be used. It will be understood that the present subject matter includes the use of adhesive coatweights less than and/or greater than these representative values.

Topcoats

A transparent polymer protective topcoat or overcoat layer may be present in the labels of the present subject matter. The protective topcoat or overcoat layer provides desirable properties to the label before and after the label is affixed to a substrate. The presence of a transparent topcoat layer over a print layer may, in some embodiments provide additional properties such as antistatic properties stiffness and/or weatherability, and the topcoat may protect the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g., UV), chemically resistant, thermally resistant thereby protecting the label and, particularly the print layer from degradation from such causes. The protective overcoat may also contain antistatic agents, or anti-block agents to provide for easier handling when the labels are being applied to containers or other articles at high speeds. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 12.5 to about 125 microns, and in one embodiment about 25 to about 75 microns. Examples of the topcoat layers are described in U.S. Pat. No. 6,106,982.

The protective layer may comprise polyolefins, thermoplastic polymers of ethylene and propylene, polyesters, polyurethanes, polyacryls, polymethacryls, epoxy, vinyl acetate homopolymers, co- or terpolymers, ionomers, and mixtures thereof.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidniethanol); Tinuvin 770 (bis-(2,2,6,6-tetramethyl-4-piperidinyl)-sebacate); and Tinuvin 783. Additional light stabilizers include the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

Liners

The label assemblies of the present subject matter may optionally comprise one or more liners. The liner(s) typically cover the adhesive layer or region(s) and are removed to expose the adhesive prior to use or application of the label to a substrate or surface of interest.

A wide array of materials can be used for the liner such as but not limited to bleached glassine (BG), polyesters such as poly(ethylene terephthalate) (PET), polypropylene (PP), semi-calendered kraft (SCK) materials and particularly clay coated SCK materials, and wood-free kraft (HF) materials. Single component and multicomponent liners and liner assemblies can also be used.

It will be understood that the various label assemblies of the present subject matter can be provided in a linerless form in which a nontacky or partially tacky adhesive is used and which is rendered tacky prior to label application. A linerless construction can also be provided in the form of a self wound construction in which a face or printed side has a release layer on an outer surface.

Primers

The label assemblies of the present subject matter may optionally comprise one or more layers or region of primer materials. The primers are typically disposed between the face layer and the adhesive. However, primers can also be applied onto an opposite side of the face layer.

Nearly any suitable primer material can be utilized. In certain embodiments the primer is in the form of an adhesion promoter or barrier coating. Ink primers can also be used.

Useful primers may be transparent or opaque and the primers may be solvent-based or water-based. In one embodiment, the primers are radiation curable (e.g., UV). The primer may comprise a lacquer and a diluent. The lacquer may be comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the primer, the selection of such viscosity being within the skill of the art.

The primer layer(s) or region(s) if used, typically have a total thickness of from 0.5 microns to 3 microns. However, it will be appreciated that thicknesses outside of this range can be used in the label assemblies of the present subject matter.

The primer(s) if used, are typically applied to the face layer by conventional techniques such as co-extrusion or spraying.

FIG. 1 is a schematic cross sectional illustration of a label assembly 100A in accordance with the present subject matter. The label 100A comprises a face layer 10, a primer layer 20, an adhesive layer 30, and a liner 40. The face layer 10 defines an outer face 12.

Figure 2:
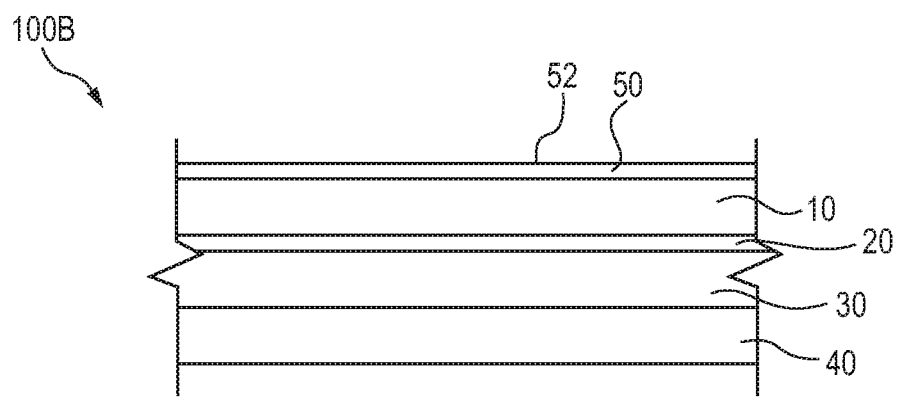
FIG. 2 is a schematic cross sectional illustration of a label assembly in accordance with another embodiment of the present subject matter.

FIG. 2 is a schematic cross sectional illustration of a label assembly 100B in accordance with the present subject matter. The label 100B comprises a face layer 10, a primer layer 20, an adhesive layer 30, and a liner 40. The label 100B also comprises a topcoat 50 disposed on the face layer 10. The topcoat 50 defines an outer face 52.

Figure 3:
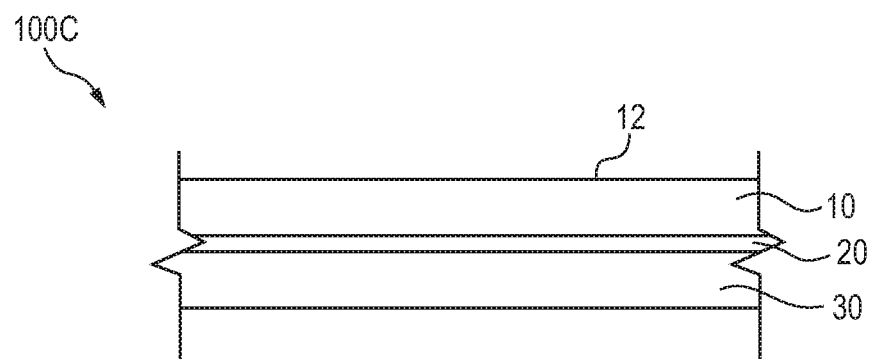
FIG. 3 is a schematic cross sectional illustration of a label assembly in accordance with another embodiment of the present subject matter.

FIG. 3 is a schematic cross sectional illustration of a label assembly 100C in accordance with the present subject matter. The label 100C comprises a face layer 10, a primer layer 20, and an adhesive layer 30. The face layer 10 defines an outer face 12.

Figure 4:
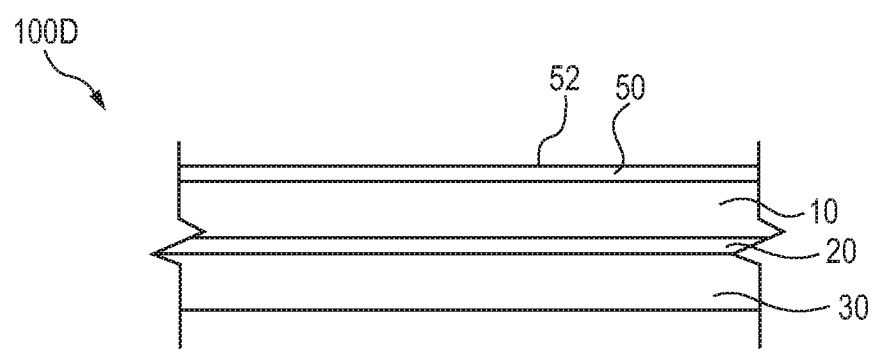
FIG. 4 is a schematic cross sectional illustration of a label assembly in accordance with another embodiment of the present subject matter.

FIG. 4 is a schematic cross sectional illustration of a label assembly 100D in accordance with the present subject matter. The label 100D comprises a face layer 10, a primer layer 20, and an adhesive layer 30. The label 100D also comprises a topcoat 50 disposed on the face layer 10. The topcoat 50 defines an outer face 52.

Figure 5:
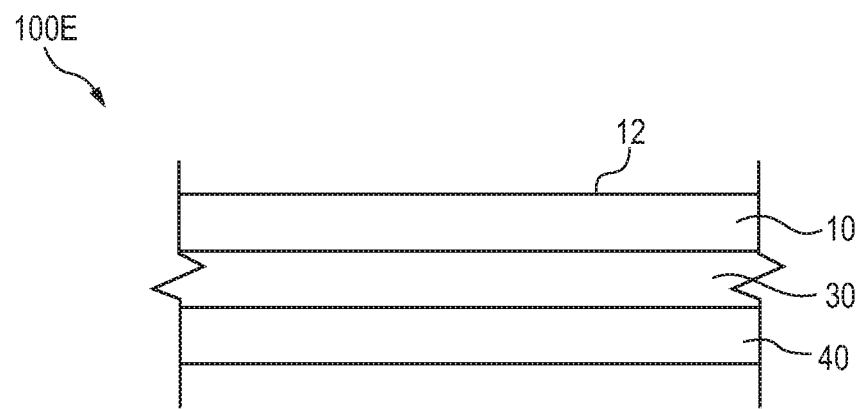
FIG. 5 is a schematic cross sectional illustration of a label assembly in accordance with another embodiment of the present subject matter.

FIG. 5 is a schematic cross sectional illustration of a label assembly 100E in accordance with the present subject matter. The label 100E comprises a face layer 10, an adhesive layer 30, and a liner 40. The face layer 10 defines an outer face 12.

Figure 6:
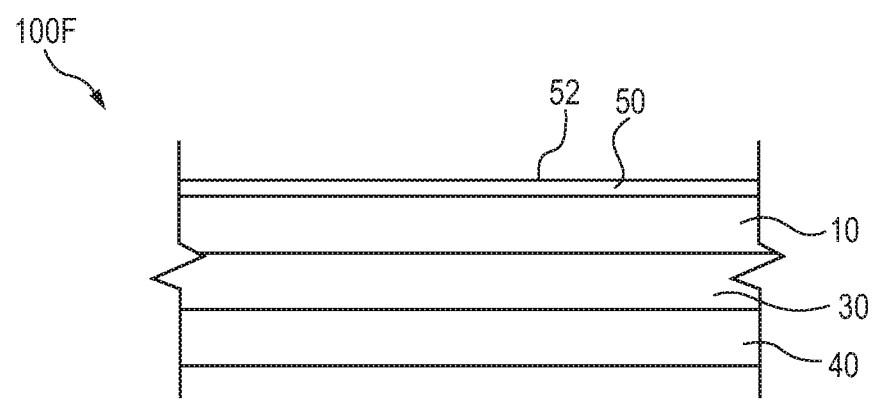
FIG. 6 is a schematic cross sectional illustration of a label assembly in accordance with another embodiment of the present subject matter.

FIG. 6 is a schematic cross sectional illustration of a label assembly 100F in accordance with the present subject matter. The label 100F comprises a face layer 10, an adhesive layer 30, and a liner 40. The label 100F also comprises a topcoat 50. The topcoat 50 defines an outer face 52.

Figure 7:
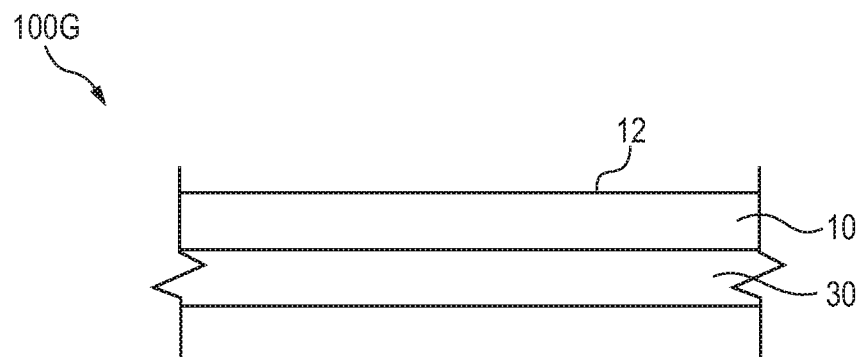
FIG. 7 is a schematic cross sectional illustration of a label assembly in accordance with another embodiment of the present subject matter.

FIG. 7 is a schematic cross sectional illustration of a label assembly 100G in accordance with the present subject matter. The label 100G comprises a face layer 10 and an adhesive layer 30. The face layer 10 defines an outer face 12.

Figure 8:
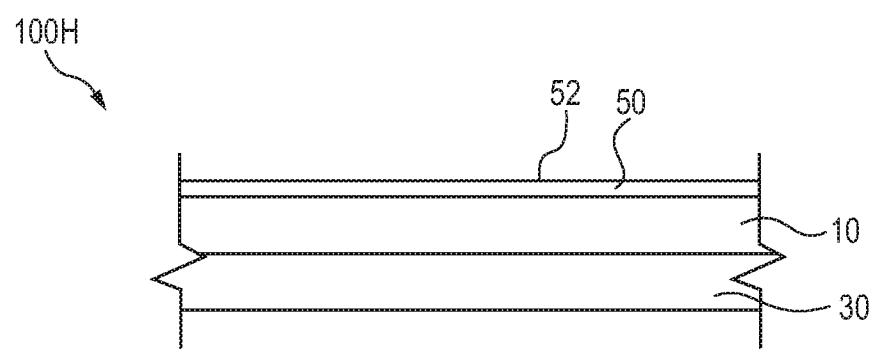
FIG. 8 is a schematic cross sectional illustration of a label assembly in accordance with another embodiment of the present subject matter.

FIG. 8 is a schematic cross sectional illustration of a label assembly 100H in accordance with the present subject matter. The label 100H comprises a face layer 10 and an adhesive layer 30. The label 100H also comprises a topcoat 50. The topcoat 50 defines an outer face 52.

Figure 9:
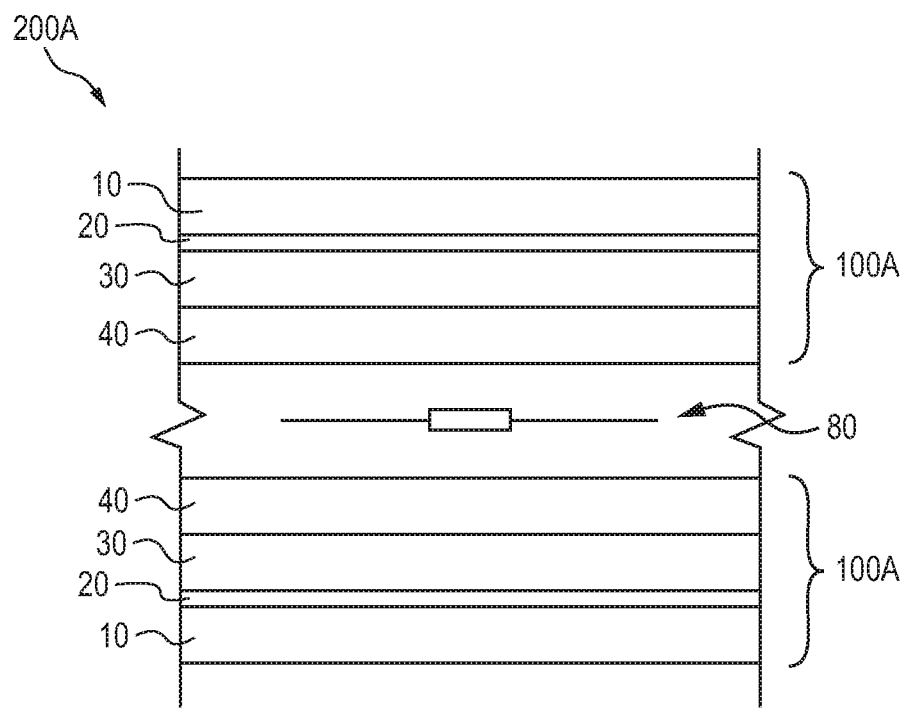
FIG. 9 is a schematic cross sectional illustration of a label assembly in accordance with another embodiment of the present subject matter.

The present subject matter also includes the use of multiple arrays and/or combinations of label assemblies. For example, FIG. 9 depicts a cross sectional illustration of a label assembly 200A including two labels 100A as previously described which are positioned to encompass and/or enclose one or more electronic components (or any other component or part that needs to be protected such as for example a washing tag) 80 which for example can be an RFID component as known in the art. It will be appreciated that prior to enclosure of the component 80, the liners 40 of the labels 100A are removed to thereby expose adhesive layers 30.

Figure 10:
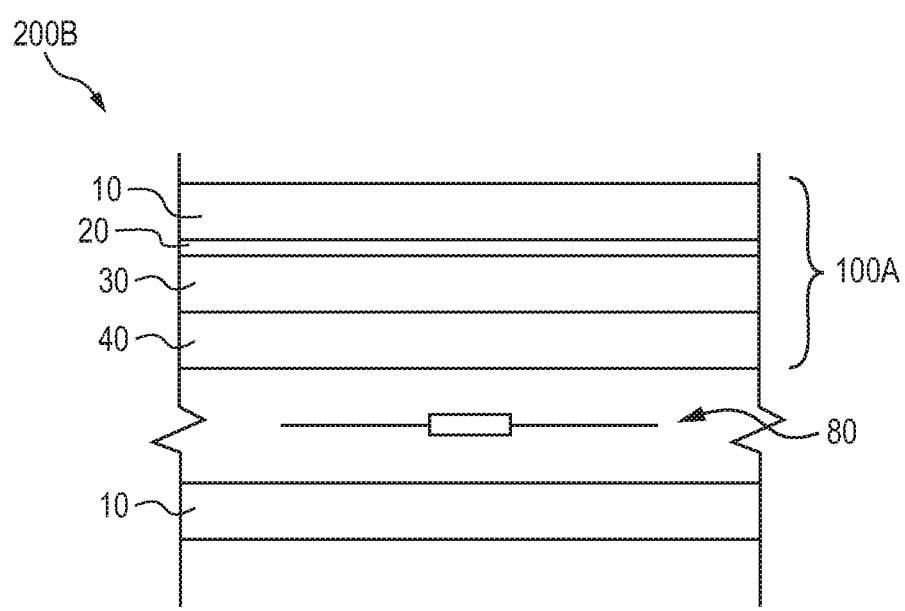
FIG. 10 is a schematic cross sectional illustration of a label assembly in accordance with another embodiment of the present subject matter.

FIG. 10 depicts another label assembly 200B including a label assembly 100A as previously described which is used in conjunction with a face layer 10 to enclose and/or encompass an electronic component 80, which may be for example an RFID component.

Details of RFID components, their operation, and their manufacture are provided in one or more of the following patents: U.S. Pat. Nos. 7,298,266; 7,212,127; 7,225,992; 7,088,248; 8,289,165; 8,068,028; 8,593,256; and 7,786,868.

It will be understood that the present subject matter includes a wide array of variations of label assemblies 200A, 200B and includes for example nearly any combination of labels 100A-100H and variations thereof.

Methods

The label assemblies of the present subject matter include one or more layer(s) or region(s) of the noted two stage adhesive which is initially in a PSA form. Typically, the labels are attached to a surface of interest by contacting the exposed PSA to the surface. The tacky adhesive surface adheres the label and maintains the label in a desired position or location on the surface. A contact force or application pressure may be applied to the label to promote adherence to the surface.

Upon appropriate placement of the label upon the surface of interest, heat is applied to thereby convert the two stage adhesive to a permanent, non-PSA adhesive. Although the particular temperature(s) necessary to convert the adhesive depends upon the chemistry of the adhesive and other factors, for many adhesive systems a conversion temperature of at least 80° C., in particular embodiments at least 120° C., in certain embodiments at least 150° C., and in particular embodiments at least 180° C. is used. In particular applications it is contemplated that the conversion temperature may be as high as about 240° C.

In certain applications, heating is performed in combination with contacting the adhesive of a label assembly to an outer surface of an article or other surface of interest. The time period for such contact time while heating is from about 1 second up to about 200 seconds for example. Such time periods may be longer such as up to 10 minutes or more.

In many applications it is desirable to subject the applied label and surface to a lamination operation in which heat and pressure are simultaneously applied to the label and its adhesive. Representative lamination time periods can be from about 0.5 seconds up to about 10 seconds with many applications utilizing a lamination time period of about 1 to 3 seconds. Representative lamination pressures are typically from 1 psi to about 100 psi, with typical lamination pressures being from 5 psi to about 20 psi. It will be appreciated that the methods of the present subject matter include the use of temperatures, time periods, and pressures different than the representative values described herein.

The present subject matter labels can be used in a wide array of applications. For example, the labels can be attached to vehicular components, vehicle accessories, consumer goods, industrial goods, and electronic components. Nonlimiting examples of vehicular components include sun visors, seat belts, interior components such as plastic panels, and fabric covered components, exterior vehicle components such as body panels which may be painted, engine components and engine accessories such as oil filters and hoses, and tire labels and particularly for application to tires prior to vulcanization. The various labels can also be attached to a wide array of other articles that are to be vulcanized. Nonlimiting examples of vehicle accessories include infant and child seats and floor mats. Nonlimiting examples of consumer goods include shoes and particularly shoe tongs or tongues, textiles or clothing such as garments and fabric items, and household bedding and blankets. Nonlimiting examples of industrial goods include drums and containers such as utilized for storage and/or transport of materials, electrical components such as transformers, converters, and motors, and piping and conduits such as plastic piping and steel or metal pipes. Nonlimiting examples of electronic components include power supplies, batteries, circuit boards, and frames and housings. It will be understood that the present subject matter includes other labeled articles.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, labels, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A label assembly comprising:
   a first face layer defining a first face and an oppositely directed second face; and
   a two stage adhesive disposed on at least one of the first face and the second face of the first face layer, the two stage adhesive exhibiting a first stage in which the adhesive is initially in the form of a pressure sensitive adhesive (PSA) and upon exposure to heat, converts from the pressure sensitive adhesive (PSA) to a permanent, non-PSA,
   wherein the pressure sensitive adhesive comprises 10-90 wt % of an acrylic backbone base polymer having molecular weight (Mw) of 5,000 to 1,000,000,
   wherein the two stage adhesive converts from the PSA to the permanent, non-PSA adhesive upon exposure to a temperature with a range of from 80° C. to 240° C., and
   wherein the heat exposure is for a time period of about 1 second to about 200 seconds.

2. The label assembly of claim 1 further comprising:
   a primer layer disposed between the first face layer and the two stage adhesive.

3. The label assembly of claim 1 further comprising:
   a liner disposed on the two stage adhesive.

4. The label assembly of claim 1 wherein the two stage adhesive is disposed on the second face of the first face layer, the label assembly further comprising:
   a topcoat disposed on the first face of the first face layer.

5. The label assembly of claim 1 wherein the first face layer is a material that can survive 10 minutes of heat at 90° C. without visible or mechanical degradation.

6. The label assembly of claim 1 wherein the first face layer material is selected from the group consisting of poly(vinyl chloride) (PVC), poly(ethylene terephthalate) (PET), polyolefins, polyamides, synthetic textiles, synthetic leathers, paper, fiber glass, polyvinylidene fluoride (PVF), metal foils, ceramics, natural leather, and combinations thereof.

7. The label assembly of claim 1 further comprising:
   a second face layer defining a first face and an oppositely directed second face;
   a component disposed between the first face layer and the second face layer.

8. The label assembly of claim 7 further comprising:
   a second two stage adhesive disposed on at least one of the first face and the second face of the second face layer, the two stage adhesive exhibiting a first stage in which the adhesive is initially in the form of a pressure sensitive adhesive (PSA) and upon exposure to heat; converts from the pressure sensitive adhesive (PSA) to a permanent, non-PSA.

9. The label assembly of claim 8 further comprising:
   a primer layer disposed between the second face layer and the second two stage adhesive.

10. The label assembly of claim 8 wherein the second two stage adhesive disposed on the second face layer converts from the PSA to permanent, non-PSA upon exposure to a temperature within a range of from 80° C. to 240° C.

11. The label assembly of claim 7 wherein the second face layer is a material that can survive 10 minutes of heat at 90° C. without visible or mechanical degradation.

12. The label assembly of claim 7 wherein the second face layer material is selected from the group consisting of poly(vinyl chloride) (PVC), poly(ethylene terephthalate) (PET), polyolefins, polyamides, synthetic textiles, synthetic leathers, paper, fiber glass, polyvinylidene fluoride (PVF), metal foils, ceramics, natural leather, and combinations thereof.

13. The label assembly of claim 7 wherein the component is an electronic component.

14. The label assembly of claim 1 wherein the glass transition temperature (Tg) of the acrylic backbone base polymer is less than 50° C.

15. The label assembly of claim 1 wherein the glass transition temperature (Tg) of the acrylic backbone base polymer is less than 0° C.

16. The label assembly of claim 1 wherein the acrylic backbone base polymer is a pre-polymerized acrylic backbone base polymer which does not contain ethylenic unsaturation along the polymer chain.

17. The label assembly of claim 7 wherein the component is a RFID.

18. A label assembly comprising:
a first face layer defining a first face and an oppositely directed second face; and
a two stage adhesive composition disposed on at least one of the first face and the second face of the first face layer, the two stage adhesive exhibiting a first stage in which the adhesive is initially in the form of a pressure sensitive adhesive (PSA) non exposure to heat, converts from the pressure sensitive adhesive (PSA) to a permanent, non-PSA,
wherein the pressure sensitive adhesive comprises 10-90 wt % of an acrylic backbone base polymer having a molecular weight (Mw) of a 5,000 to 1,000,000, and
wherein the thickness of the first face layer is from about 20 microns to about 150 microns.

19. The label assembly of claim 1 wherein the pressure sensitive adhesive comprises
20-80 wt % of the acrylic backbone base polymer having a molecular weight (Mw) of 5,000 to 1,000,000;
5-80 wt % of at least one structural diluent;
0-4 wt % of at least one crosslinker;
0-10 wt % of a catalyst; and
0-10 wt % of stabilizer/process aid.

20. The label assembly of claim 19 wherein the structural diluent is selected from the group consisting of 3,4-epoxycyclohexylmethyl-3,4-epoxycyclohexanecarboxylate (S-21), Bis[(3,4-epoxycyclohexyl)methyl]adipate (S-28), difunctional bisphenol A/epichlorohydrin derived liquid epoxy resin (Epon 828), Bisphenol A epoxy resin having a weight per epoxide of 235-263 g/eq as measured by ASTM D1652 (Epon 834), beta-(3,4-epoxycyclohexyl)ethyltrimethoxysilane (A-186), gamma-glycidoxypropyltrimethoxysilane (A-187), glycidyl ester of neodecanoic acid (EP-10), isocyanate-functional urethane acrylate (Desmolux D100), isocyanate-bearing urethane acrylate (Desmolux D200), aliphatic polyisocyanate (low-viscosity hexamethylene diisocyanate (HDI) biuret) (Desmodur N3200), aliphatic polyisocyanate (hexamethylene diisocyanate (HDI) biuret) (Desmodur N100), aliphatic polyisocyanate (hexamethylene diisocyanate (HDI) trimer) (Desmodur N3300), poly(propylene oxide) (PPO) oligomer having a molecular weight (Mw) of less than 5,000 Daltons, trimethylolpropane oxetane (TMPO), poly(ethylene oxide) (PEO) oligomer having a molecular weight (Mw) of less than 5,000 Daltons, ethyl hexyl oxetane (2EH oxetane), difunctional oxetane, trimethylolpropane triacrylate (TMPTA) of the following formula (5), tripropyleneglycol diacrylate (TPGDA) of the following formula (6), ethoxylated bisphenol A diacrylate of the following formula (7) in which n+m=3, ethoxylated trimethylolpropane triacrylate of the following formula (8), bisphenol A diglycidyl ether diacrylate of the following formula (9), 1,2-cyclic ethers, 1,3-cyclic ethers, 1,4-cyclic ethers, anhydrides, lactones, lactams, cyclic ethers, siloxanes, oxazolines, oxalidines, and bismaleimides;

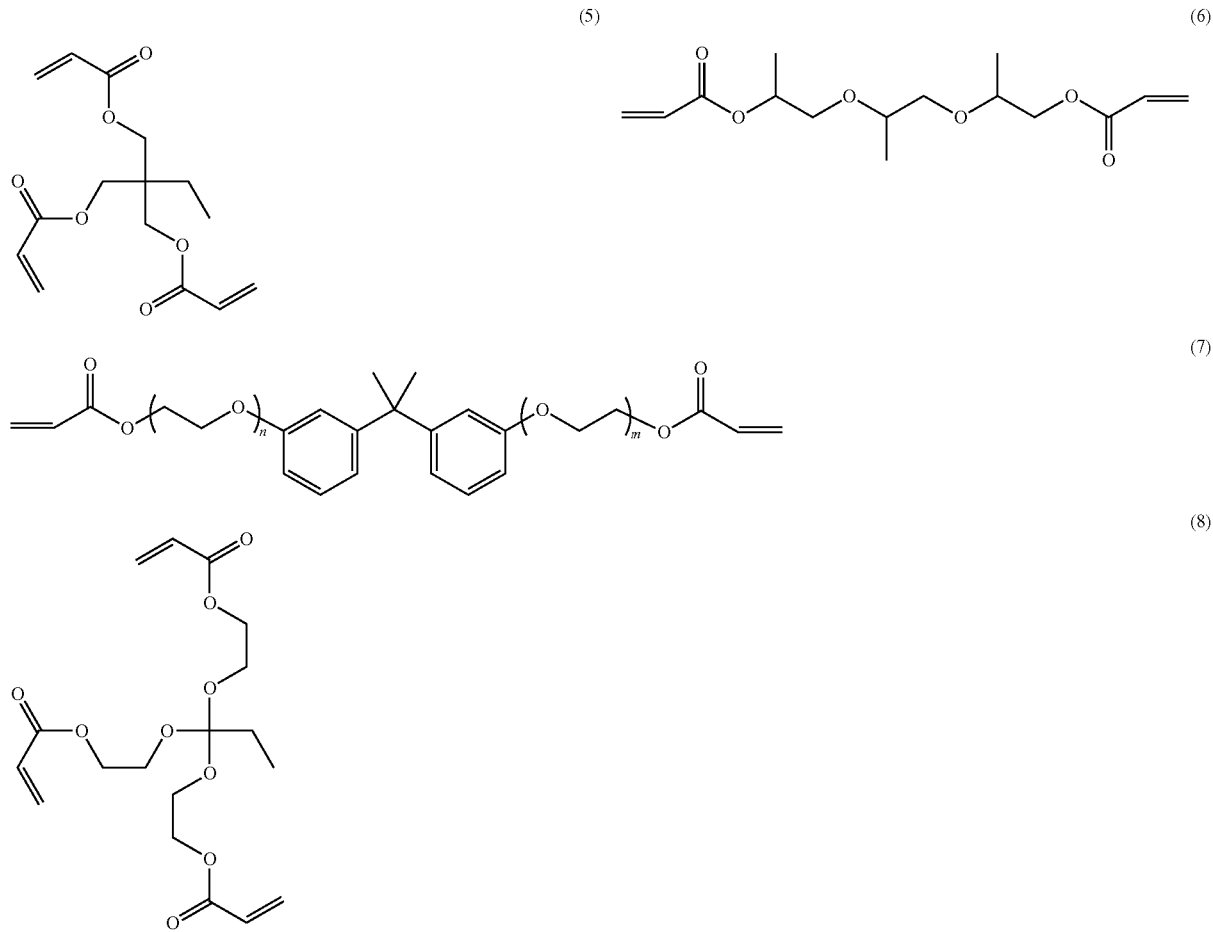

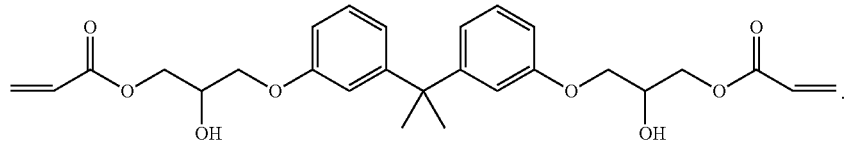

(9)

21. The label assembly of claim 2 wherein the primer comprises a lacquer and a diluent.

22. The label assembly of claim 21 wherein the lacquer comprises one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof.

23. The label assembly of claim 21 wherein the diluent comprises alcohols, esters, aromatic hydrocarbons, ketones, aliphatic hydrocarbons, and mixtures thereof.

24. A label assembly comprising:
a first face layer defining a first face and an oppositely directed second face; and
a two stage adhesive disposed on at least one of the first face and the second face of the first face layer, the two stage adhesive exhibiting a first stage in which the adhesive is initially in the form of a pressure sensitive adhesive (PSA) and upon exposure to heat, converts from the pressure sensitive adhesive (PSA) to a permanent, non-PSA,
wherein the pressure sensitive adhesive comprises 10-90 wt % of an acrylic backbone base polymer having a molecular weight (Mw) of 5,000 to 1,000,000,
wherein the glass transition temperature (Tg) of the acrylic backbone base polymer is less than 50° C., and
wherein the first face layer is selected from the group consisting of polyvinyl chloride (PVC) film, polyethylene terephthalate (PET) film, polyolefin film, polyamide film, synthetic textiles, synthetic leathers, paper, fiber glass, polyvinylidene fluoride (PVF) film, metal foils, ceramics, natural leather, and combinations thereof.

25. The label assembly of claim 24 wherein the glass transition temperature (Tg) of the acrylic backbone base polymer is less than 0° C.

* * * * *